United States Patent
Komiya et al.

(10) Patent No.: US 6,211,911 B1
(45) Date of Patent: Apr. 3, 2001

(54) IMAGE PROCESSING APPARATUS

(75) Inventors: Yasuhiro Komiya, Hachioji; Kangda Wang, Chofu, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/313,032

(22) Filed: May 17, 1999

Related U.S. Application Data

(62) Division of application No. 08/541,644, filed on Oct. 10, 1995, now Pat. No. 6,097,430.

(30) Foreign Application Priority Data

Oct. 14, 1994 (JP) .................................................. 6-249344

(51) Int. Cl.⁷ .................................................. H04N 5/225
(52) U.S. Cl. .................................... 348/218; 348/335
(58) Field of Search .................................. 348/207, 218, 348/219, 231, 232, 233, 239, 241, 335, 340, 343, 344, 360, 373; 382/284; 358/453

(56) References Cited

U.S. PATENT DOCUMENTS

| | | |
|---|---|---|
| 4,829,339 | 5/1989 | Dwyer . |
| 5,159,455 | 10/1992 | Cox . |
| 5,386,228 | 1/1995 | Okino . |
| 5,452,105 * | 9/1995 | Tamagaki et al. .................... 358/453 |
| 5,528,290 | 6/1996 | Saund . |
| 5,576,758 | 11/1996 | Arai et al. . |
| 5,640,202 | 6/1997 | Kondo et al. . |
| 5,646,679 | 7/1997 | Yano et al. . |
| 5,930,405 * | 7/1999 | Chida .................................. 382/284 |

\* cited by examiner

*Primary Examiner*—Tuan Ho
(74) *Attorney, Agent, or Firm*—Frishauf, Holtz, Goodman, Langer & Chick, P.C.

(57) ABSTRACT

An image processing apparatus comprises an image inputting section having a photographing lens, a semiconductor image pickup element, such as a CCD, an A/D converting section for converting an obtained image signal to a digital signal, image correcting sections for subjecting respective images which are obtained at a plurality of image inputting sections to correction in terms of geometric displacement due to optical aberration, an image composing section for joining corrected images, a monitor and a printer. When a plurality of images are to be joined, a geometric displacement, such as aberration of the photographing lens, is corrected on a to-be-composed image on the basis of the photographing condition so that a joined image is obtained.

26 Claims, 19 Drawing Sheets

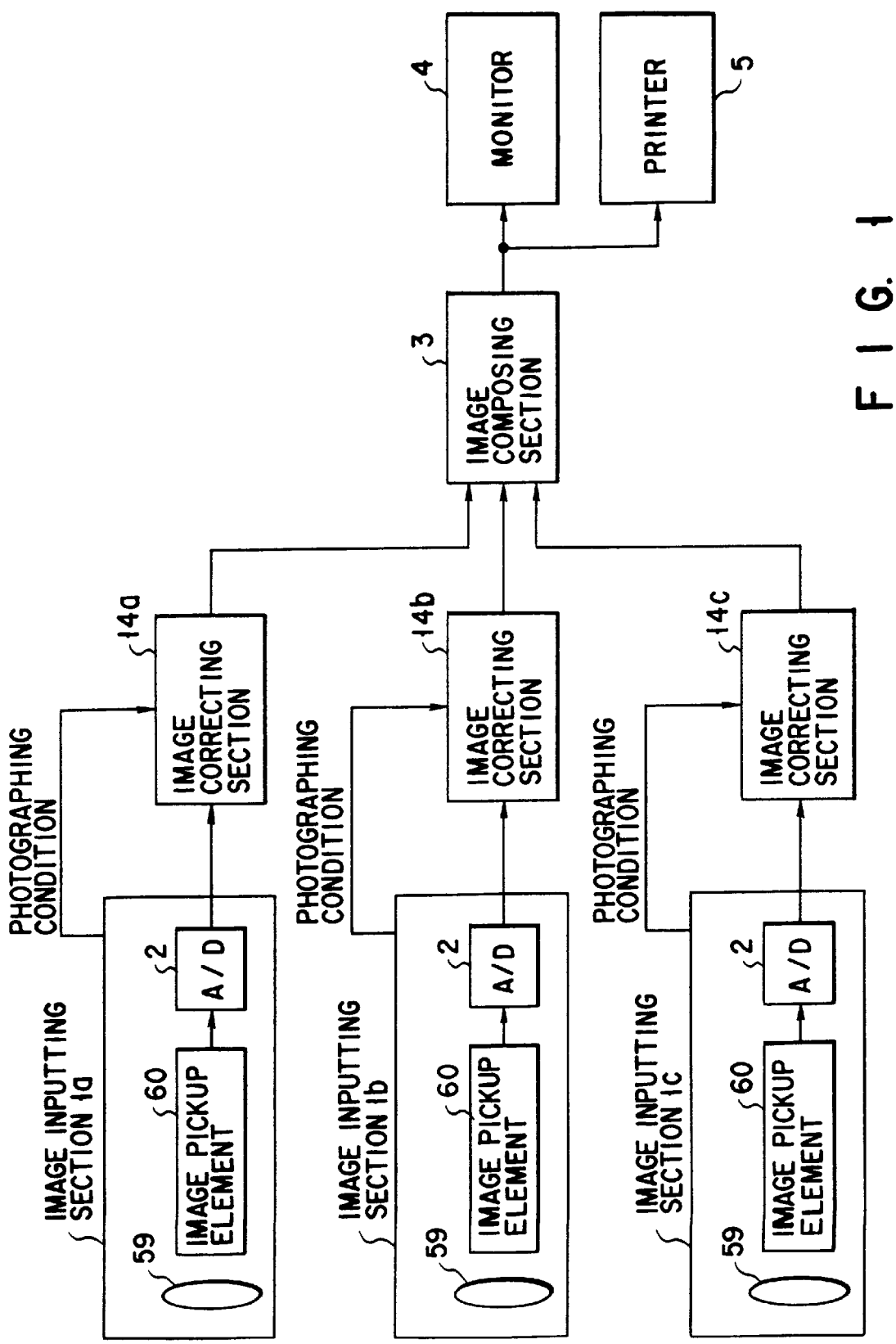
F I G. 1

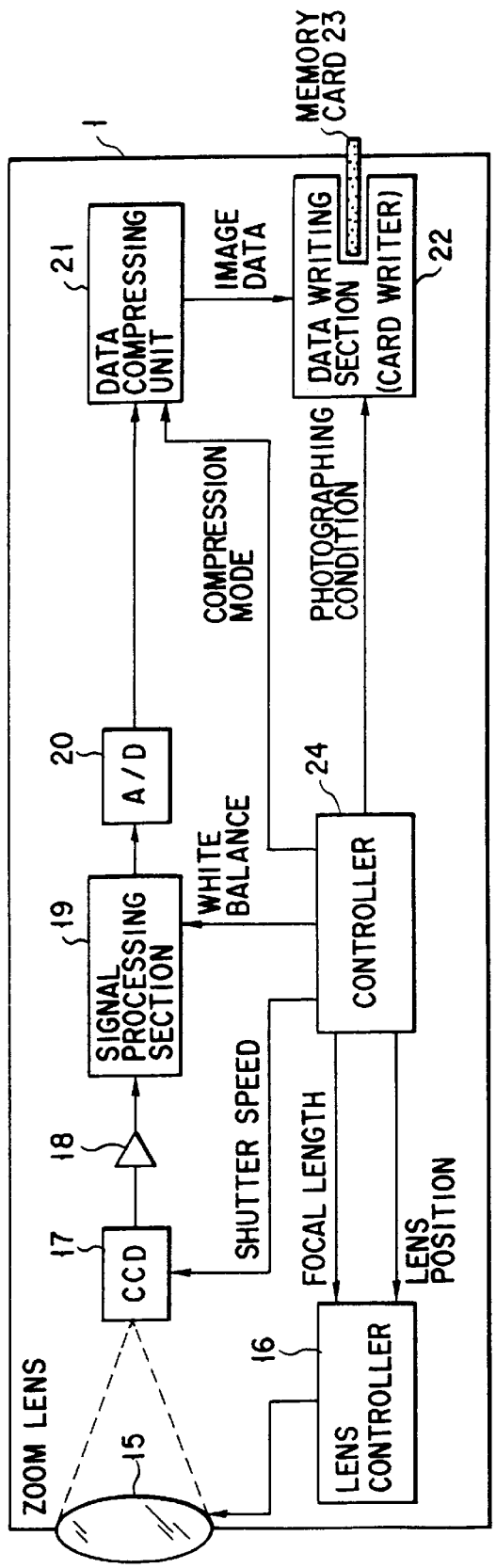
F I G. 3A
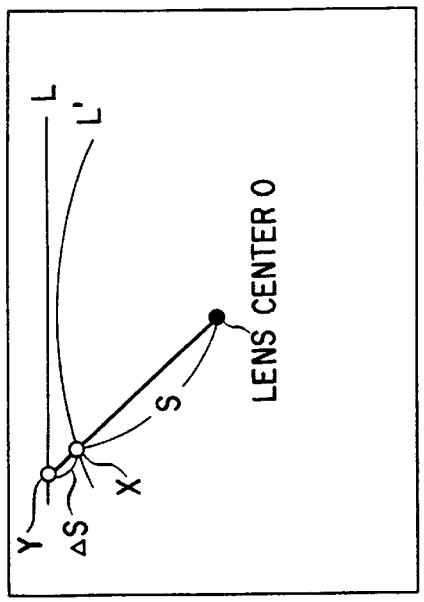
F I G. 3B

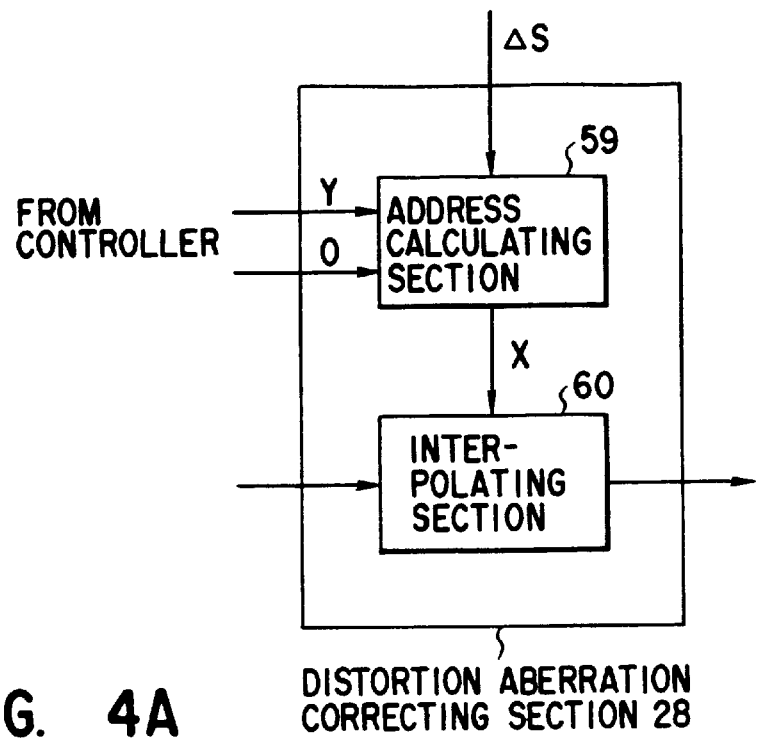
F I G. 4A
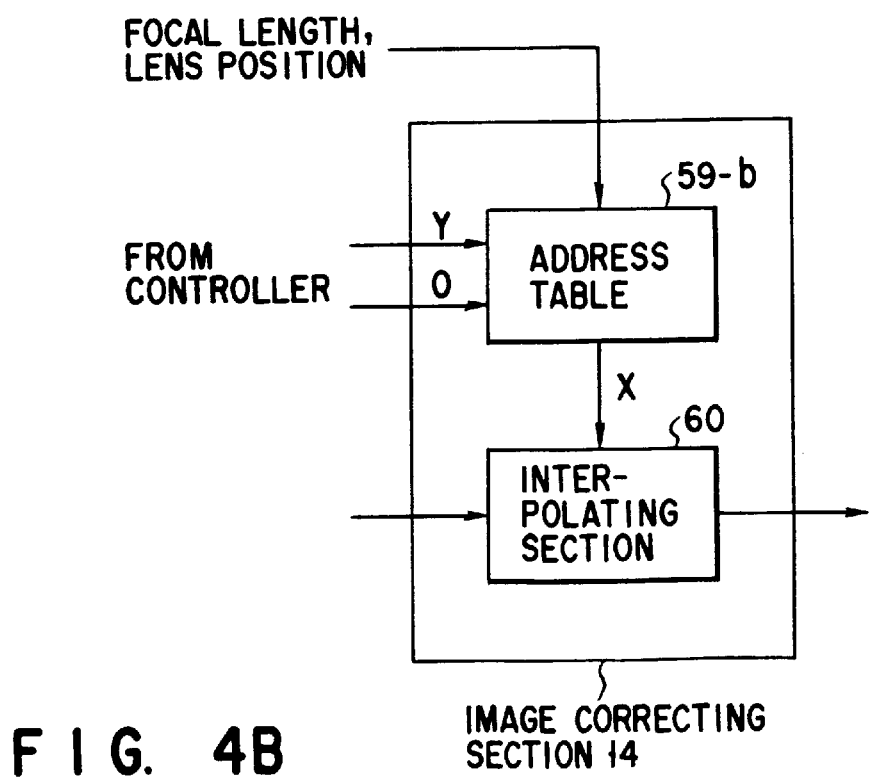
F I G. 4B

SCHEMATIC DIAGRAM OF DIGITAL STILL CAMERA

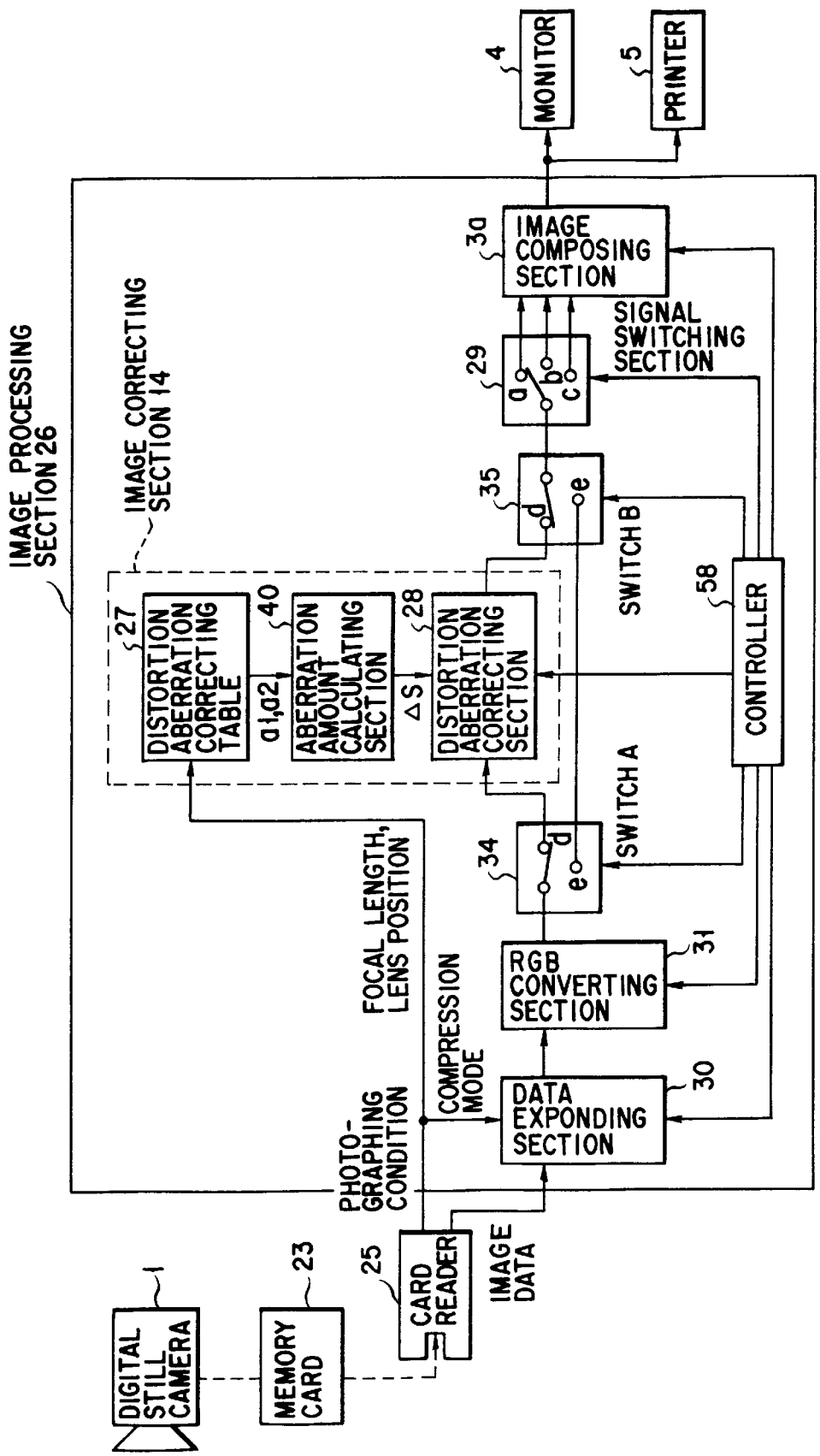
F I G. 9

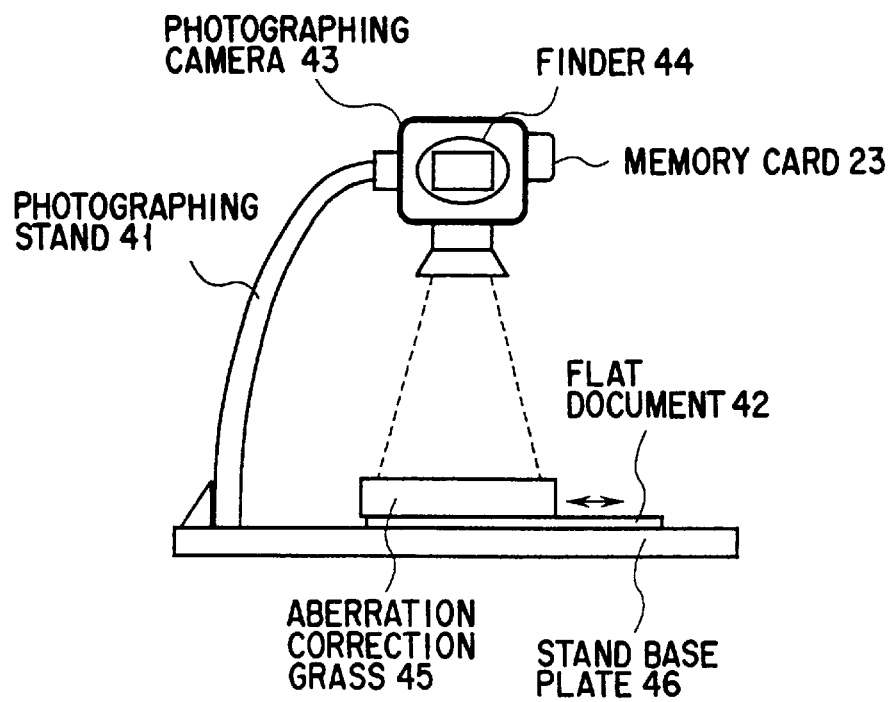
F I G. 12
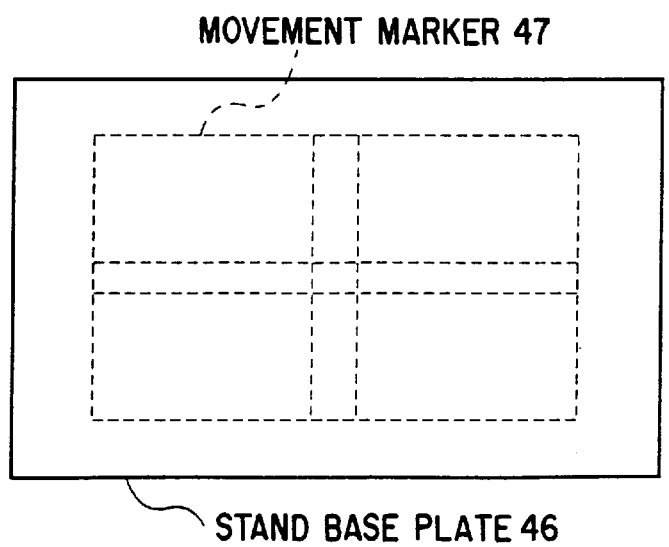
F I G. 13

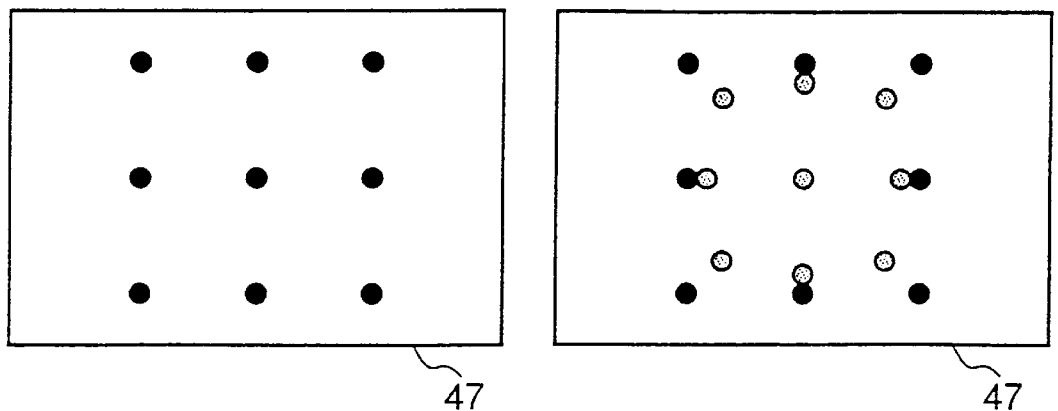
F I G. 14A          F I G. 14B
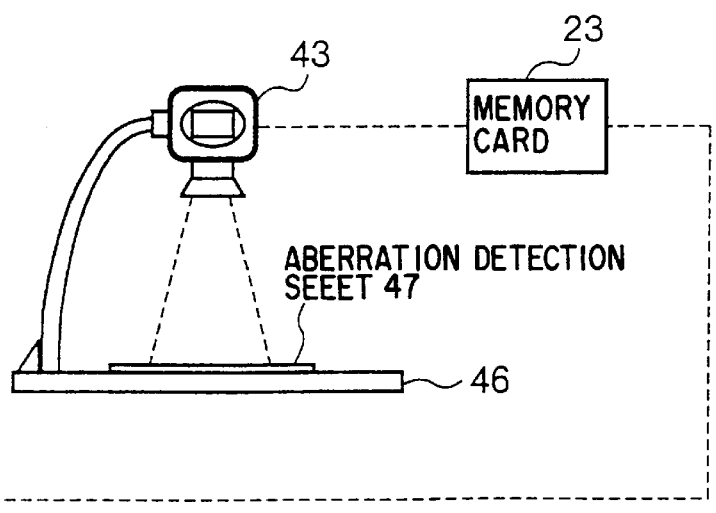
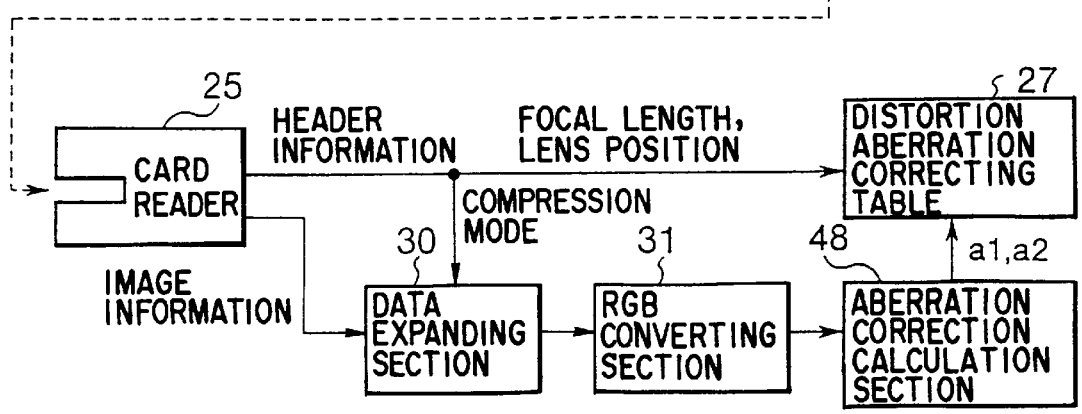
F I G. 15

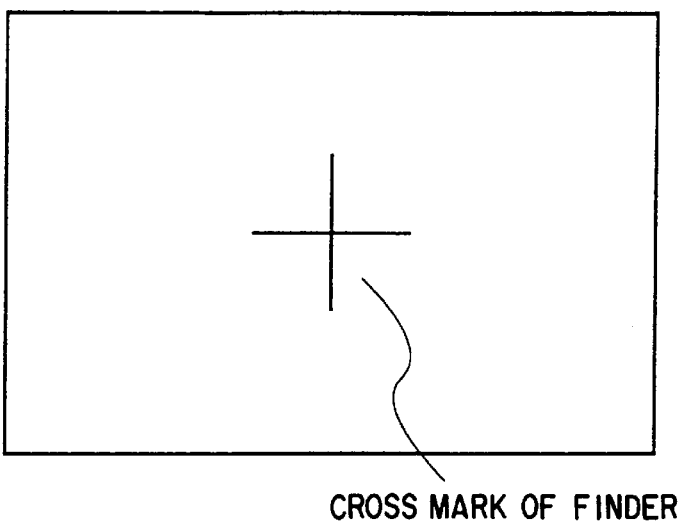
CROSS MARK OF FINDER
F I G. 16
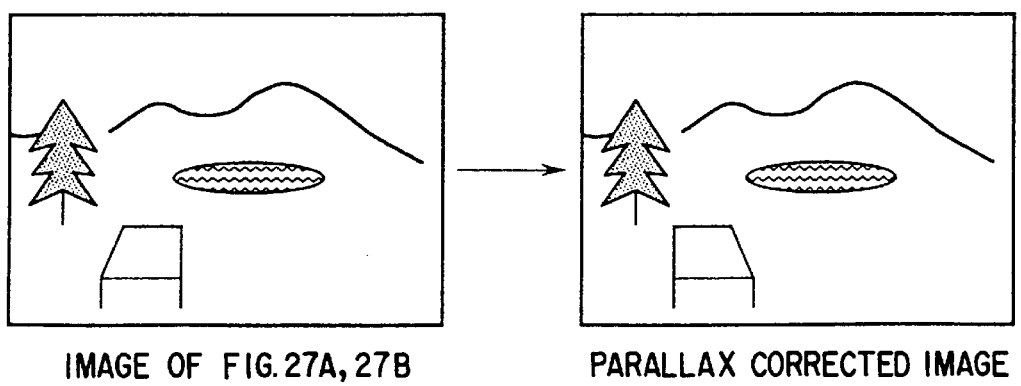
IMAGE OF FIG. 27A, 27B
PARALLAX CORRECTED IMAGE
F I G. 17A    F I G. 17B

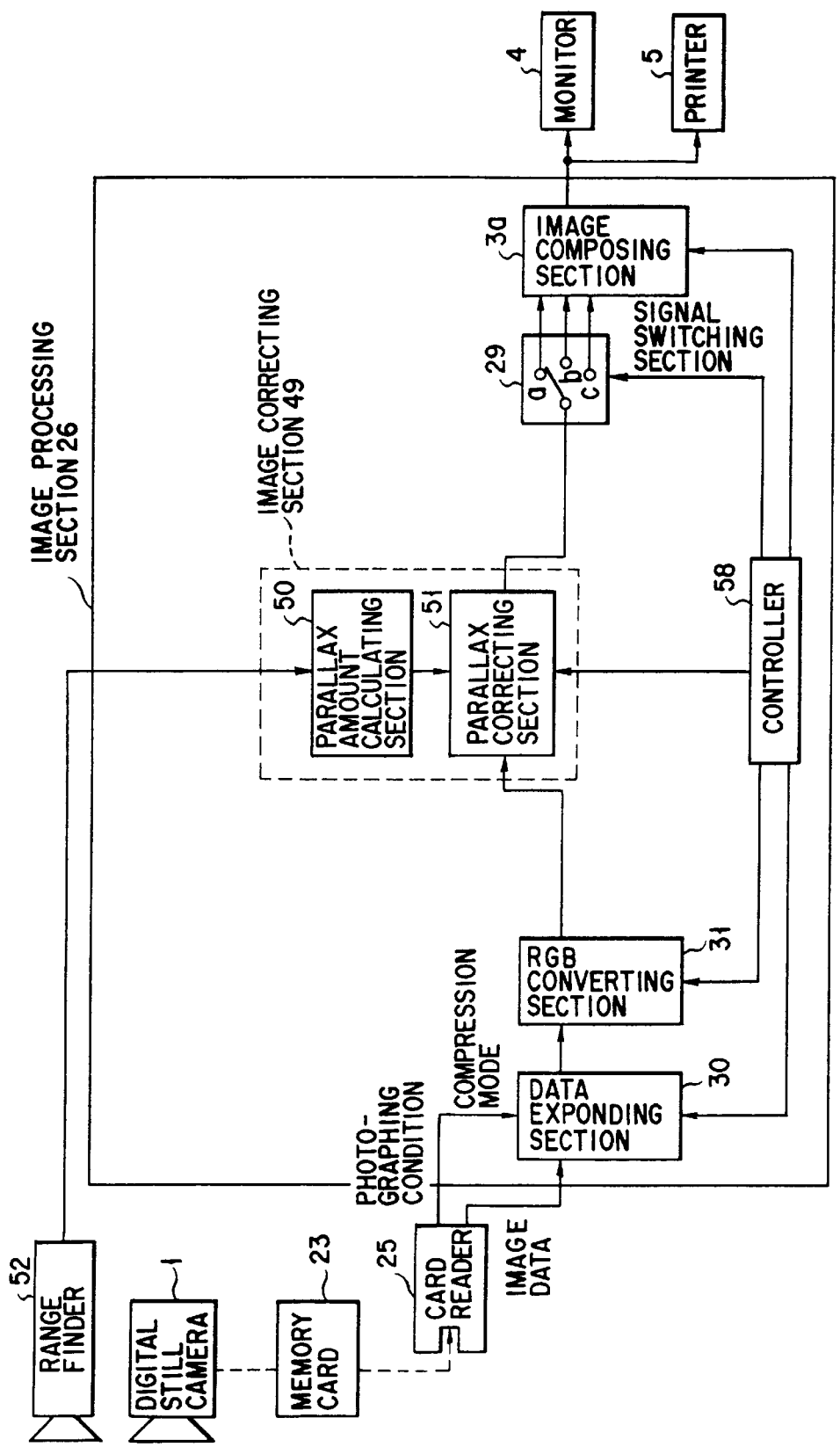
F I G. 18

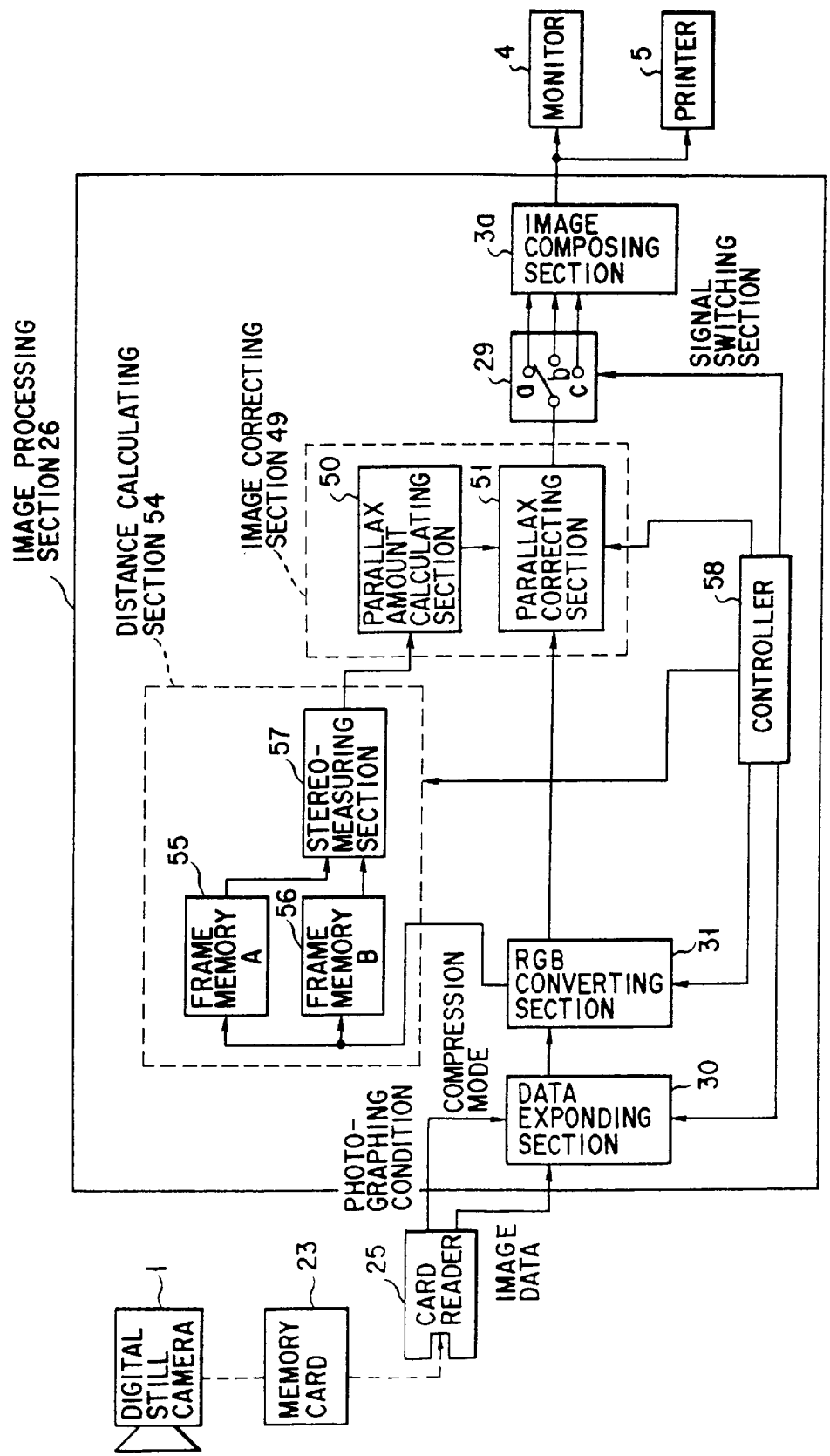
F I G. 19

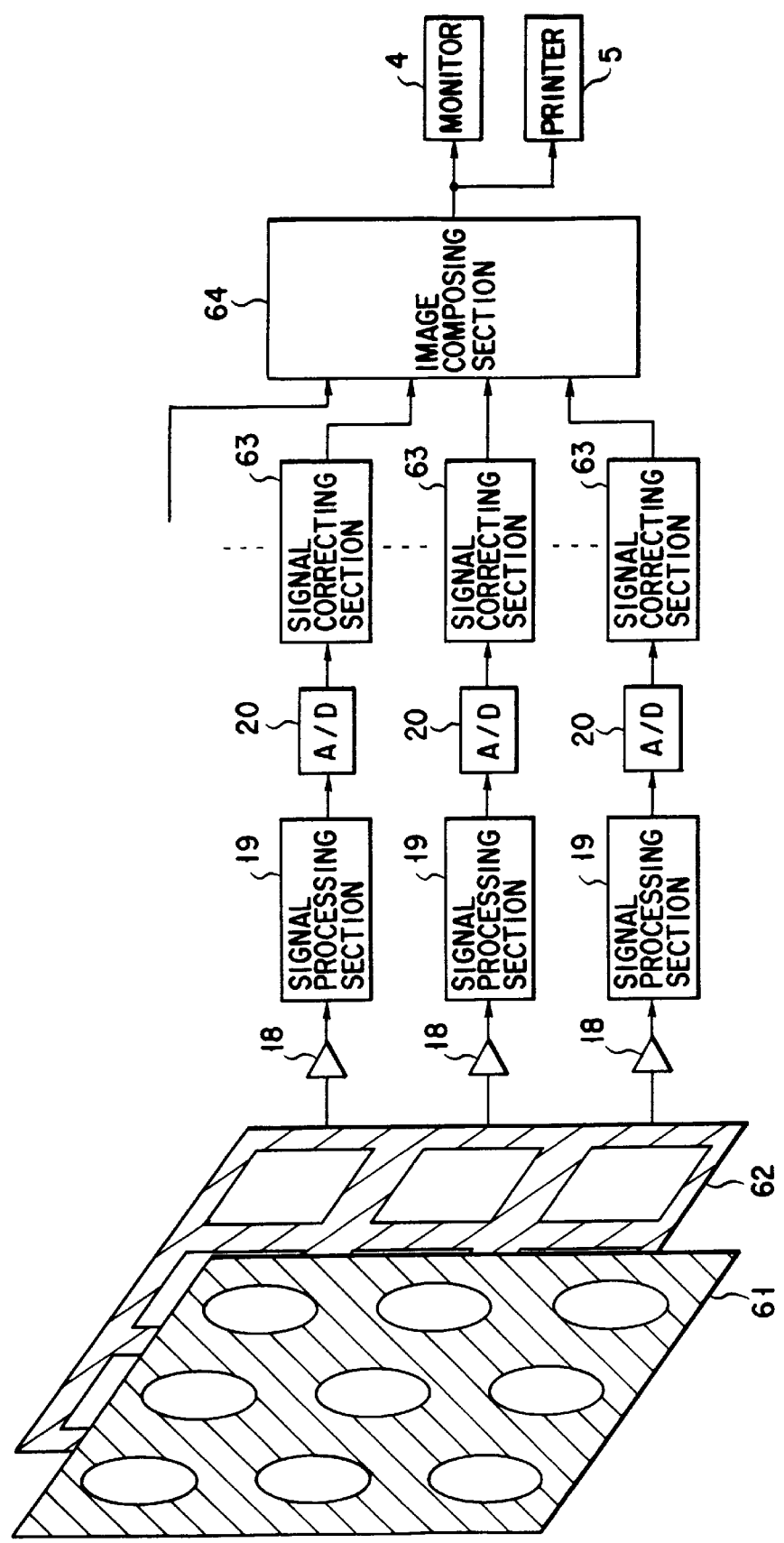
F I G. 20

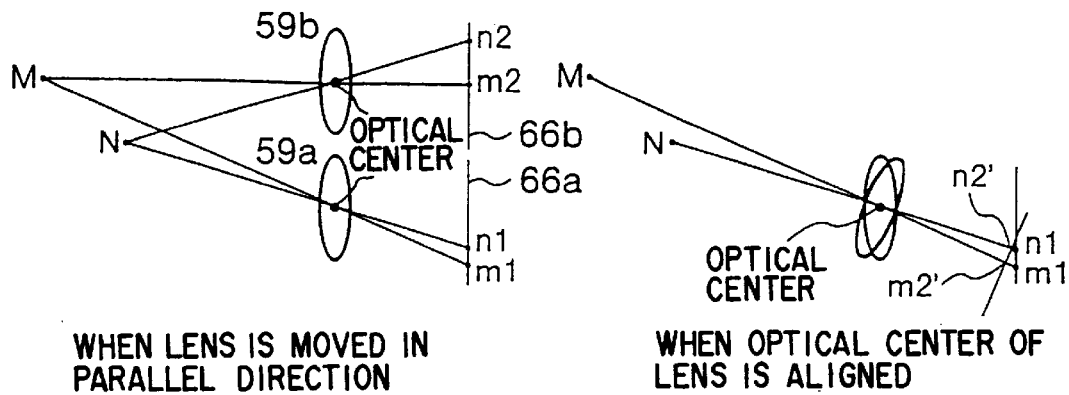
FIG. 21A  WHEN LENS IS MOVED IN PARALLEL DIRECTION
FIG. 21B  WHEN OPTICAL CENTER OF LENS IS ALIGNED
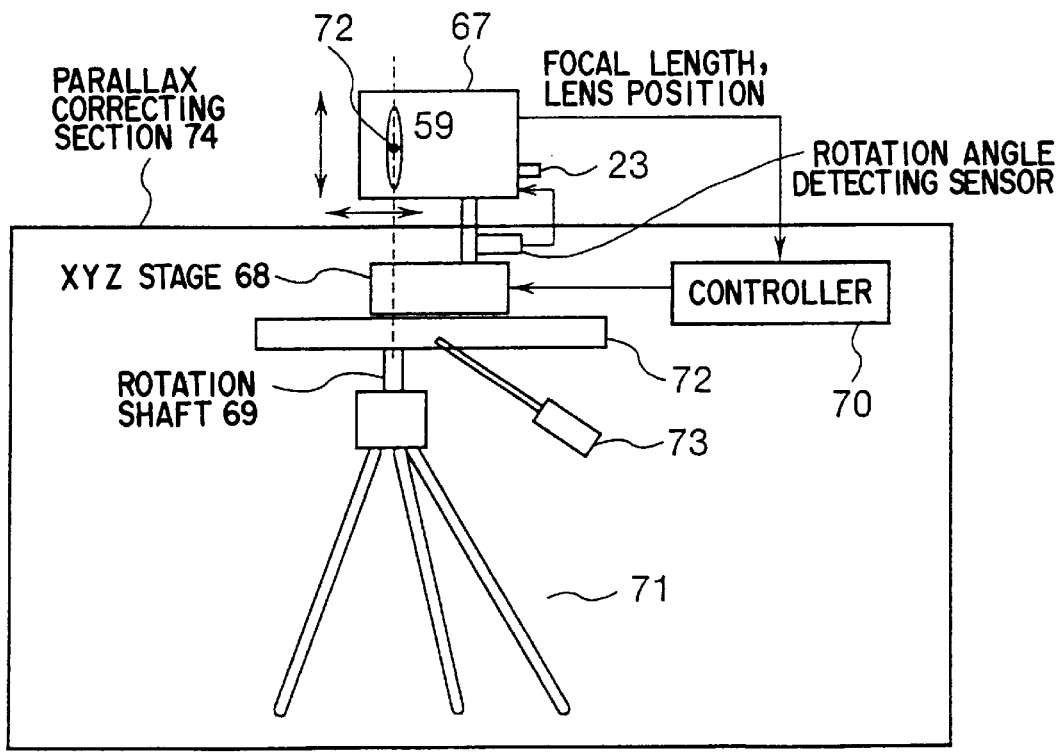
FIG. 22

IMAGE PROCESSING APPARATUS

This is a division of application Ser. No. 08/541,644 filed Oct. 10, 1995 U.S. Pat. No. 6,097,430.

BACKGROUND OF THE INVENTION

1. Field of the Invention

The present invention relates to an image processing apparatus for obtaining a broader-range photograph by photographing a subject image in a plurality of divided parts and joining or composing together part-images.

2. Description of the Related Art

Generally, an image pickup apparatus using a solid image pickup element, such as a CCD, has been broadly employed for electronic still cameras, video cameras, etc., and there has been a growing demand for those having a higher resolution and for those having a broader area range.

A technique for achieving a broader range photographing as well as a higher image resolution has been disclosed in U.S. patent application Ser. No. 08/045,038 (abandoned in favor of File Wrapper Continuation application Ser. No. 08/969,937) filed by the applicant. For the purpose of achieving a higher-resolution apparatus, a proposal has been made there to obtain a composed image by photographing an image with one photographing lens, picking up the image in divided parts by a plurality of image pickup elements and subjecting those part-images to signal processing. Also, a proposal has been made there to obtain a composed image by photographing a subject image in divided parts through the switching of the light beam by a mirror and through the switching of a fixed area by a camera/subject movement and subjecting the corresponding data to signal processing, noting that, in this case, use is made of only one image pickup element. Both are common in terms of the signal processing as will be explained below with respect to FIGS. 23 to 25.

FIG. 23 is a view showing a whole arrangement of a conventional image pickup apparatus.

In the image pickup apparatus of FIG. 23, image inputting sections 1a to 1c, each, comprise a photographing lens 59, image pickup section 60, such as a CCD, and A/D converter 2 and are so arranged that a subject image is overlappingly taken in different positions. For brevity's sake, here, a signal involved is of a monochrome type.

Here it is assumed that the subject 6 is a planar document such as a design drawing. The outputs of the image pickup sections are A/D converted by the respective A/D converters 2 to digital equivalents and the outputs of the A/D converters 2 are input to an image composing section 3 as images a, b and c. Through the later-described processing at the image composing section 3' a composed image is generated as images a, b, c, as shown in FIG. 24 and is output to a monitor 4 and to a printer 5.

The image composing section 3 detects a positional image-to-image displacement from those signals corresponding to overlapped areas in an image, interpolates the image in accordance with the image areas and provides an image-to-image seam.

FIG. 25 shows an arrangement of the image pickup section 3.

The image composing section 3 comprises frame memories 7a to 7c for storing the images a, b, c, displacement detector 8a for detecting a positional displacement of the images a, b as a parallel movement amount S1 and rotational amount R1 from those signals in the overlapped areas of images a, b, displacement detector 8b for detecting a positional displacement of images b, c as a parallel movement amount S2 and rotational amount R2 from those signals corresponding to the overlapped areas of the images b, c, interpolation calculator 9b for performing interpolation calculation by the use of an affine transformation so that the image b is joined to an array for the image a on the basis of S1, R1, interpolation calculator 9c for performing interpolation calculation so that the image c is joined to an array for the images a, b on the basis of S2, R2, multiplies 11a to 11c which, in order to perform processing for making an image-to-image seam less pronounced, effecting multiplication by coefficient Ca, Cb, Cc so that these coefficients are gradually varied (an example between given two points P, Q) at the overlapped areas in the image as shown in FIG. 24, coefficient setting units 10 for setting these coefficients, adders 12 for additively combining the outputs of the multipliers 11a to 11c, and a frame memory 13 for storing a joined image.

By the operation of the image composing section 3 it is possible to obtain a better composed image even if there are some rotations in the image as shown in FIG. 24.

Although the conventional arrangement has been explained as using three cameras, the same is true about two or four or more cameras.

In the above-mentioned conventional image pickup apparatus, an image is composed through the parallel movement and rotation and, if there is aberration such as a distortion in the photographing lens, an image varies in the overlapped areas at a time of simple parallel movement and rotation. This involves a disadvantage in that, due to the failure to properly detect the positional displacement and due to the image differing at those overlapped areas after being interpolated, an image emerges in very unsightly way.

It has been common practice to mount the electronic camera, etc., on a zoom lens when it is employed. When a grid-like pattern is to be photographed, a barrel-shaped distortion aberration is generally produced, in particular, on a wide-angle side, as shown in FIG. 26A. In such an image example, an image varies in the overlapped areas and hence an image composition is difficult to achieve.

In the case where a three-dimensional subject, not the planar document, is to be photographed, parallax occurs in a plurality of cameras and the same problem as set out above occurs.

FIG. 27 shows the case where objects in varying distances are photographed. Since an object (a table) on the front side varies in shape due to the effect of parallax, it suffers the same adverse effect as in the case of aberration.

SUMMARY OF THE INVENTION

It is accordingly the object of the present invention to provide an image processing apparatus for obtaining composed image by, at a time of composing an image, correcting a geometric displacement resulting from the aberration of the photographing lens and parallax.

According to one aspect of the present invention, there is provided an image processing apparatus comprising:

image inputting means comprising one or more image inputting sections integral with, or separate from, an apparatus body, the image inputting section having a photographing lens system adapted to form a light image and at least one image pickup element photo-electrically converting the light image to obtain an image;

image correcting means for subjecting one or more images which are obtained from the image inputting means to geometric correction; and image joining means for detecting, for a plurality of images including an image geometrically corrected by the image correcting means, a positional relation of a subject image whose portions are to be joined as common image portions and for joining together the plurality of subject images, while being matched in their images, to obtain a whole image.

According to another aspect of the present invention, there is provided an image processing apparatus comprising:

image inputting means comprising one or more inputting sections integral with, or separate from, an apparatus body, the image inputting section comprising a photographing lens system adapted to form a light image and at least one image pickup element photo-electrically converting the light image to obtain an image;

image storing means for storing image data which is output from the image inputting means;

image correcting means for subjecting the image data which is read from the image storing means to geometric correction; and image joining means for detecting, for a plurality of images including an image data geometrically corrected by the image correcting means, a positional relation of a subject image data whose portions are to be joined as common image portions and for joining together the plurality of subject images data, while being matched in their images data, to obtain a whole image data.

According to another aspect of the present invention, there is provided an image processing apparatus comprising:

image inputting means comprising one or more image inputting sections, integral with, or separate from, an apparatus body, the image inputting section comprising a photographing lens system adapted to form a light image and at least one image pickup element photo-electrically converting the light image to obtain an image;

image correcting means for subjecting one or more images which come from the image inputting section or sections to geometric correction;

image storing means for storing the image or images which are geometrically corrected; and image joining means for detecting, for a plurality of images including an image geometrically corrected by the image correcting means, a positional relation of a subject image whose portions are to be joined as common image portions and for joining together the plurality of subject images, while being matched in their images, to obtain a whole image.

BRIEF DESCRIPTION OF THE DRAWINGS

FIG. 1 is a view showing a schematic arrangement showing an image processing apparatus according to the present invention;

FIG. 3A shows a practical array of a digital still camera;

FIG. 3B shows a model representing a distortion aberration;

FIG. 4A is a view showing an arrangement of a distortion aberration correcting section; and FIG. 4B is a view showing an arrangement of an image correcting section;

FIG. 9 is a view showing the arrangement of the second embodiment;

FIG. 12 is a view showing a practical form of an image inputting section of an image processing apparatus according to a fifth embodiment of the present invention;

FIG. 13 is a view showing a rough positional alignment using a movement marker;

FIGS. 14A and 14B are views showing one practical form of an aberration detection sheet in an image processing apparatus according to a sixth embodiment of the present invention;

FIG. 15 is a view showing an arrangement of calculating a correction value in the sixth embodiment;

FIG. 16 shows one example of a cross-mark displayed on a finder;

FIGS. 17A and 17B are views for explaining an aberration correction in a seventh embodiment of the present invention;

FIG. 18 is a view showing an image processing apparatus according to a sixth embodiment of the present invention;

FIG. 19 is a view showing a schematic arrangement of an image processing apparatus according to an eighth embodiment of the present invention;

FIG. 20 is a view showing a schematic arrangement of an image processing apparatus according to a ninth embodiment of the present invention;

FIGS. 21A and 21B, each, are an explanatory view for explaining a way of how to make parallax smaller in a tenth embodiment of the present invention;

FIG. 22 is a view showing an arrangement of the image processing apparatus according to the tenth embodiment;

DETAILED DESCRIPTION OF THE PREFERRED EMBODIMENTS

Figure 2:
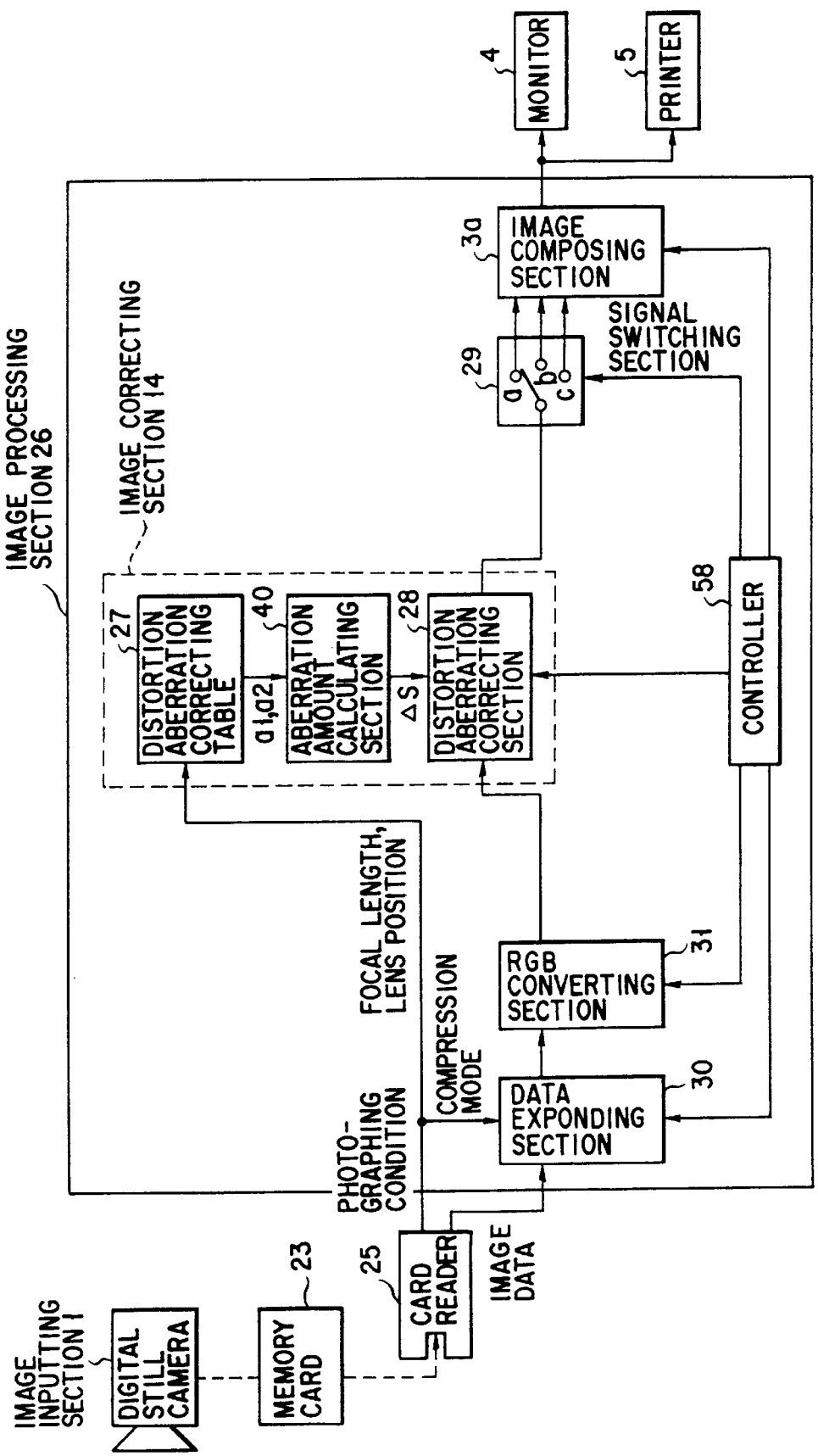
FIG. 2 is a view showing an arrangement of an image processing apparatus according to a first embodiment of the present invention.

The embodiments of the present invention will be explained below with reference to the accompanying drawings.

The schematic arrangement of an image processing apparatus according to the present invention will be explained below with reference to FIG. 1.

The apparatus comprises three image input sections 1a to 1c, image correction sections 14a, 14b and 14c for subjecting those images which are obtained from the image input sections 1a, 14b and 14c to correction for their geometric displacement, such as a parallax and an aberration of a photographing lens, an image composing section 3 for composing together corrected images, a monitor 4 and a printer 5.

The image input section 1a to 1c, each, comprises a photographing lens 59, a semiconductor image pickup element 60 such as at least one CCD, and an A/D converter 2 for converting an obtained image signal to a digital signal.

Figure 26A:
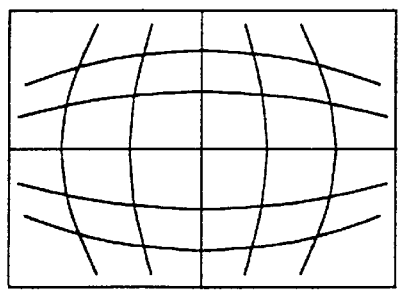
FIGS. 26A and 26B are views for explaining distortion aberration correction.
Figure 26B:
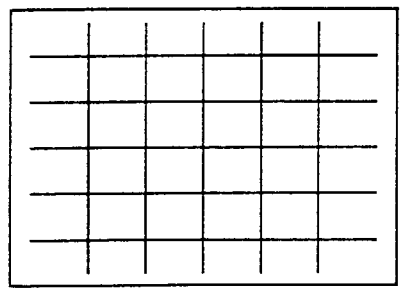

Upon composing together a plurality of images, the apparatus subjects those composing images to a correction for their geometric displacement, such as a parallax and aberration of a photographic lens, on the basis of photographic conditions and is characterized by having, as shown in FIG. 1, image correction sections 14 for correcting for the aberration and parallax. For a barrel distortion for instance, the image correction section allows an image as shown in FIG. 26A to be corrected as shown in FIG. 26B for image-compose processing.

The arrangement of an apparatus according to a first embodiment of the present invention, as shown in FIG. 2, will be explained below. Here, the image processing apparatus for composing together images photographed by a digital still camera will be explained below by way of example.

The apparatus comprises a digital still camera 1 serving as an image input section for photographing images, a detachable memory card 23 with written data such as the images photographed by the digital still camera, a card reader 25 mounted at the memory card 23 and adapted to read out recorded data, an image processing section 26 for correcting the aberration of the photographed image relating to the read-out data and for performing image-compose processing, a monitor 4 for displaying the images, etc., and a printer 5 for printout.

The digital still camera 1 is so constructed as shown in FIG. 3A.

The photographing lens 15 for photographing a subject is comprised of, for example, a zoom lens with a focal length of about 10 mm to 20 mm and its focal length and focusing lens position are controlled by a lens controller 16. The camera 1 further includes a CCD 17 for converting a subject image to a color image signal, an amplifier 18 for amplifying the signal, a signal processing section 19 for performing signal processing, such as a white balance adjustment or γ correction, an A/D converter 20 for converting the signal to a digital signal, a data compressing unit 21 for performing JPEG compression processing at a compression rate differing depending upon a compression mode, a data writing section (card writer) 22 for writing data at a predetermined address in a memory card 23 comprised of a storage medium, and a controller 24 for controlling a camera as a whole.

The controller 24 sets a focal length, a lens position, a shutter speed of the CCD 17, a white balance, a compression mode, etc. The setting values of the photographing conditions, such as at the focal length, lens position, shutter speed of the CCD 17, white balance, compression mode, etc., are sent to the data writing section, combined with the image data compressed as header information of data and written as such into the memory card 23 by the data writing section 22.

Reverting back to FIG. 2, further explanation of the present invention will be given below.

The image processing section 26 of the image processing apparatus comprises a data expansion section 30 for expanding compression data in accordance with the compression mode, an RGB converting section 31 for converting an expanded signal to an RGB signal, an image correction section 14 for correcting a distortion aberration, etc., a signal switching section 29 for allowing switches to be switched in accordance with the photographing data, an image composing section 3a for composing together images, and a controller 58 for controlling whole processing.

The image correction section 14 comprises a table 27 which, in order to correct the distortion aberration, stores correction coefficients for distortion correction and outputs correction coefficients a1, a2 corresponding to the focal length of the header information and distortion aberration from lens position information, an aberration calculating section 40 for calculating an aberration amount $\Delta S$ in accordance with the correction coefficients a1, a2 and Equation (1) as will be set out below, and an aberration correction section 28 for performing distortion correction in accordance with the aberration amount $\Delta S$.

Here a fuller explanation will be given about the correction of the distortion aberration.

The distortion aberration is normally generated by geometrical distortion caused by a distance from the center of a lens and FIG. 3B shows a model representing the distortion aberration.

Usually, if a lens involves any distortion aberration, a straight line L is imaged as a distorted one like a curve L' and a point Y on the straight line L moves to a point X in the curve L'. If, therefore, such distortion is to be corrected, all that is required in this respect is to perform a move processing for moving the point X to the point Y. In this processing, it is only necessary to move the point X by an amount $\Delta S$ in an XY direction. Here, $\Delta S$ is found from a polynomial $$\Delta S = a1 S^2 + a2 S^4 \tag{1}$$

where the coefficients a1, a2 represent the correction coefficients. Since the correction coefficients a1, a2 differ in accordance with the focal length of the lens and focusing lens position, these coefficients are set, according to the present embodiment, in accordance with the focal length from the header information of data and lens position.

In the aberration amount calculating section 40, calculation is made on the distance $\Delta S$ between a precorrected position (the point X position) and a corresponding postcorrected point Y. In the distortion aberration correcting section 28, as shown in FIG. 4A, the coordinate of a len's center position O and point Y are input from the controller 58 to the address calculating section 59 to find a point X. The point X5 coordinate is input to an interpolating section 60. In the interpolating section 60, those pixel values at the point X position are found through the interpolation calculation to obtain a point Y value.

Figure 5:
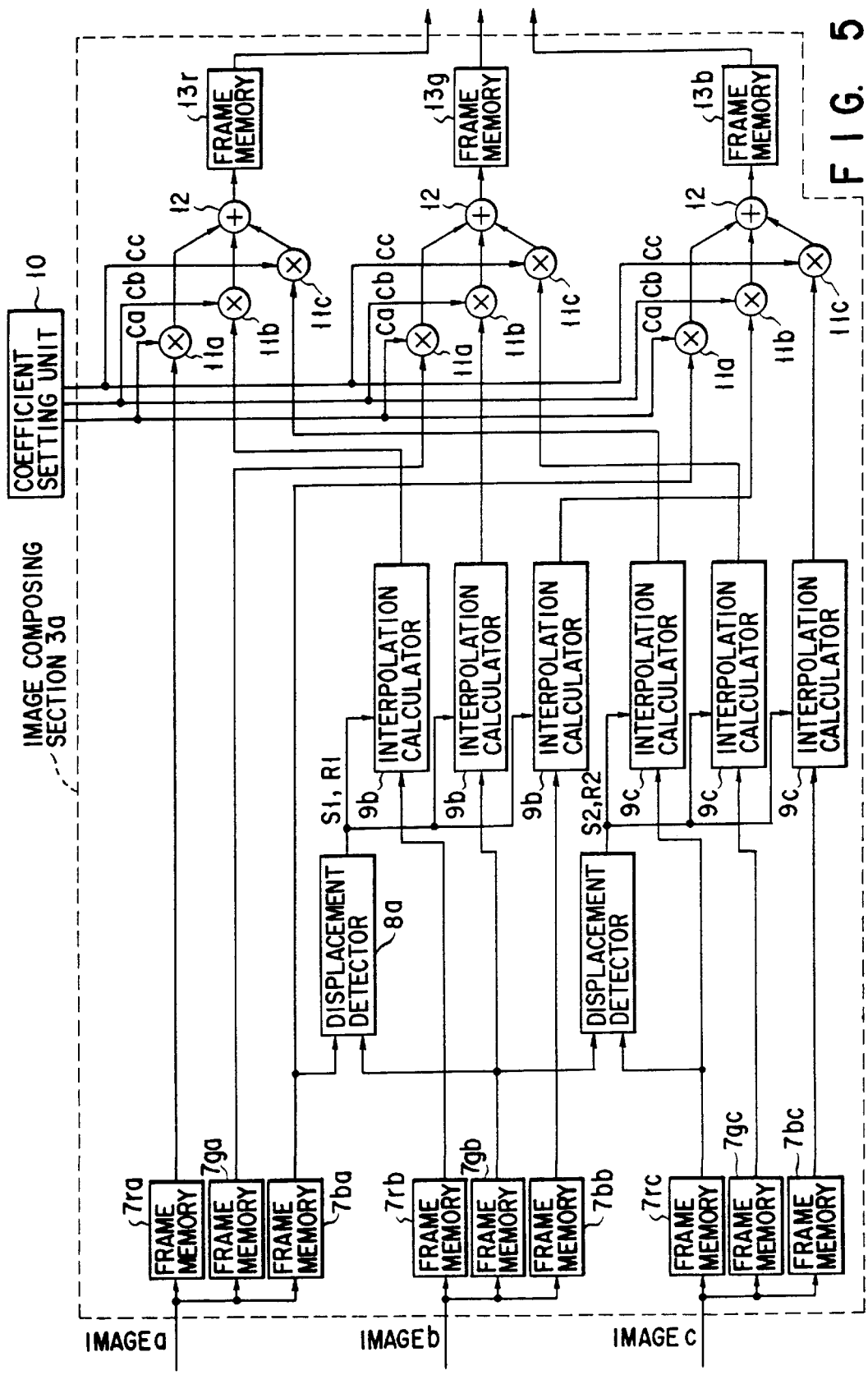
FIG. 5 is a view showing a practical array of the image composing section as shown in FIG. 2.

FIG. 5 shows a schematic form of the image composing section 3a shown in FIG. 2.

The image composing section 3a is different from the image composing section 3 shown in FIG. 1 in that inputs correspond to RGB color signals, not monochrome signals and that the displacement detection is made on a G signal only.

The image composing section 3a has, as frame memories, frame memories 7ra, 7ga, 7ba for storing RGB signals of a first picked-up image, frame memories 7rb, 7gb and 7bb for storing RGB signals of a second picked-up image and frame memories 7rc, 7gc and 7bc for storing RGB signals of a third picked-up image and frame memories 13r, 13g and 13b for storing the RGB signals of composed images.

The operation of the image processing apparatus according to the present embodiment will now be explained below.

Here, an explanation will be given below of an example where a planar document, such as a design drawing, is photographed in three divided parts.

The photographer, after designating a "photographing in parts" through the depression of a mode button not shown, holds a digital still camera 1 by hand or fixes a tripod in place and orients the camera at a subject to photograph a first image (referred to as an image a). He or she, watching a finder of the camera not shown, manually moves a zoom lens to set the focal length at a desired magnification and sets the camera to a position (corres. to the image a in FIG. 24) corresponding to about one third at a left side of a photographing image.

With a shutter button of the camera, not shown, half-depressed, auto-focusing, auto-exposure and auto-white balance are automatically adjusted. Then with the shutter button completely depressed the image at that time is photoelectrically A/D-converted by image-pickup elements, data-compressed and, as image data, written into a predetermined address of a memory card 23. At that time, the photographing conditions such as the focal length and lens position are also written as header information into predetermined addresses in the memory card 23.

Figure 24:
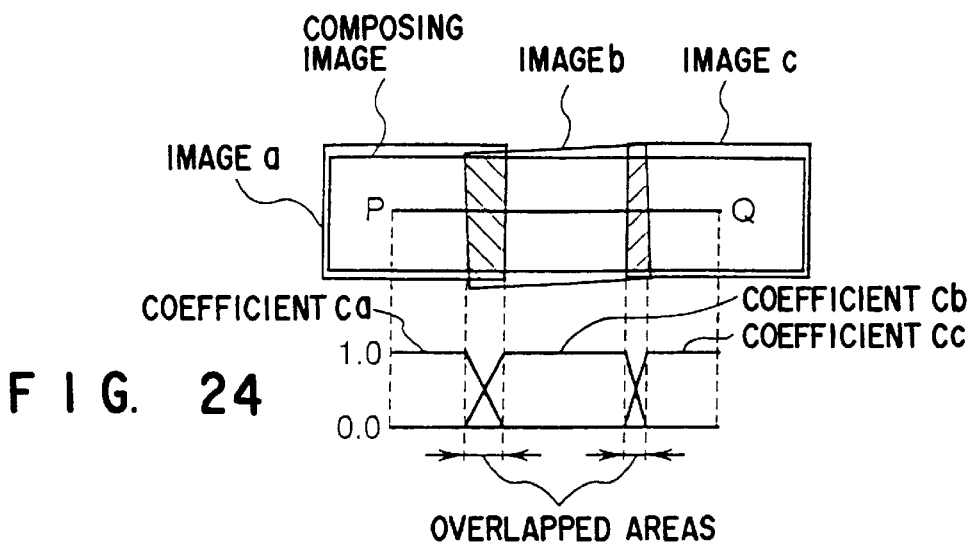
FIG. 24 is an explanatory view for explaining a relation of overlapped areas to coefficients at a time of composing a whole image.

Then in order to photograph a second image (referred to as an image b) the photographer moves the camera in a right direction to orient it at a photographing position corresponding to nearly one-third of the photographing image (corres. to an image b in FIG. 24). In this way, the image data and photographing conditions are similarly written into the memory card 23.

In order to photograph a third image (referred to as an image c), the photographer moves the camera in the right direction to set it to a photographing position corresponding to nearly one third of the photographing image (corres. to an image c in FIG. 24). In this way, one photographing image plane is photographed in three divided parts.

In the compose processing of a three-part image the memory card 23 is withdrawn from the digital still camera 1 and mounted in the card reader 25. In order to record the signals in the frame memories 7ra, 7ga, 7ba, the signal switching section 29 turns the switch a on, the photographing conditions of the image a of the three photographed images are read out and the correction coefficients a1, a2 are read out from the distortion aberration correction table in accordance with the focal length and lens position.

Upon photographing by such a method, the selection of processings can be effected by reading out the photographing conditions, so that an efficient operation is achieved. The read-out image data is sent to the data expanding section 30 in accordance with the data compression mode to have the image expanded, is converted to the RGB signals by the RGB converting section 31 and sent to the distortion aberration correction section 28 where the distortion aberration is corrected in accordance with the correction coefficients a1, a2.

The distortion-corrected image data is sent via the switch a in the signal switching section 29 to the frame memory 7ra as the R signal, to the frame memory 7ga as the G signal and to the frame memory 7ba as the B signal for sequential storage. In this way, the image b is stored as corresponding signals to the frame memories 7rb, 7gb and 7bb and the image c to the frame memories 7rc, 7gc and 7bc for sequential storage.

A displacement detector 8a detects positional displacements of the images a and b, as a parallel movement amount S1 and rotational amount R1, from those image signals stored in the frame memories 7ga, and 7gb and an interpolation calculation is carried out by an interpolation collector 9b so as to join the image b to the image a as an array in accordance with the corresponding values obtained.

Similarly, a displacement detector 8b detects positional displacements of the images b and c, as a parallel movement amount S2 and rotational amount R2, from those image signals stored in the frame memories 7gb and 7gc and a corresponding interpolation calculation is done so as to connect the image c to the array of the images a and b in accordance with the corresponding values obtained.

By multipliers 11a, 11b and 11c and adder 12, processing is performed such that an image-to-image seam is not prominent. The RGB signals of a composite image are written in the respective frame memories 13r, 13g and 13b. The composite image is sent to the monitor 4 and to a printer 5.

As will be seen from the above, the image processing apparatus of the first embodiment composes the image through the correction of their distortion aberrations and it is, therefore, possible to perform between composite processing even if those images are taken by a camera involving distortion aberration.

Further, in the present embodiment, the information necessary to correct the focal length, lens position, etc., upon the taking of the images are recorded as a header in the memory card and, based on these values, the distortion correction is carried out, thus ensuring better composite processing. In the case where the header information does not contain the focal length and lens position, if the wide edge and ∞ (infinity) are used as the setting values, there is usually less problem and, since the image data is stored in the memory means such as a card, it is not necessary that geometrical amendment and image composition be effected simultaneously with the inputting of the images.

Further in the present embodiment, use is made of a detachable medium such as the memory card and it is, therefore, possible to construct the image inputting section and image processing section separately and compactly. The photographing conditions are stored as the header of the image and can be accessed with the same time as the image data. The distortion correction table has only to be recorded with only two values a1, a2 for the respective focal length and lens position and can be constructed of, for example, a ROM, etc., of less memory content. Although, in the present embodiment, Equation (1) has been used to correct the distortion aberration, various equations may be used in accordance with the zoom lens 15.

Although, in the first embodiment, a plurality of images are picked up with one camera by varying the direction of the camera, it may of course be possible to take an image as different parts with the use of cameras. Further, the image processing section 26 of the present embodiment can of course be embodied as a software for a personal computer, etc.

Figure 6:
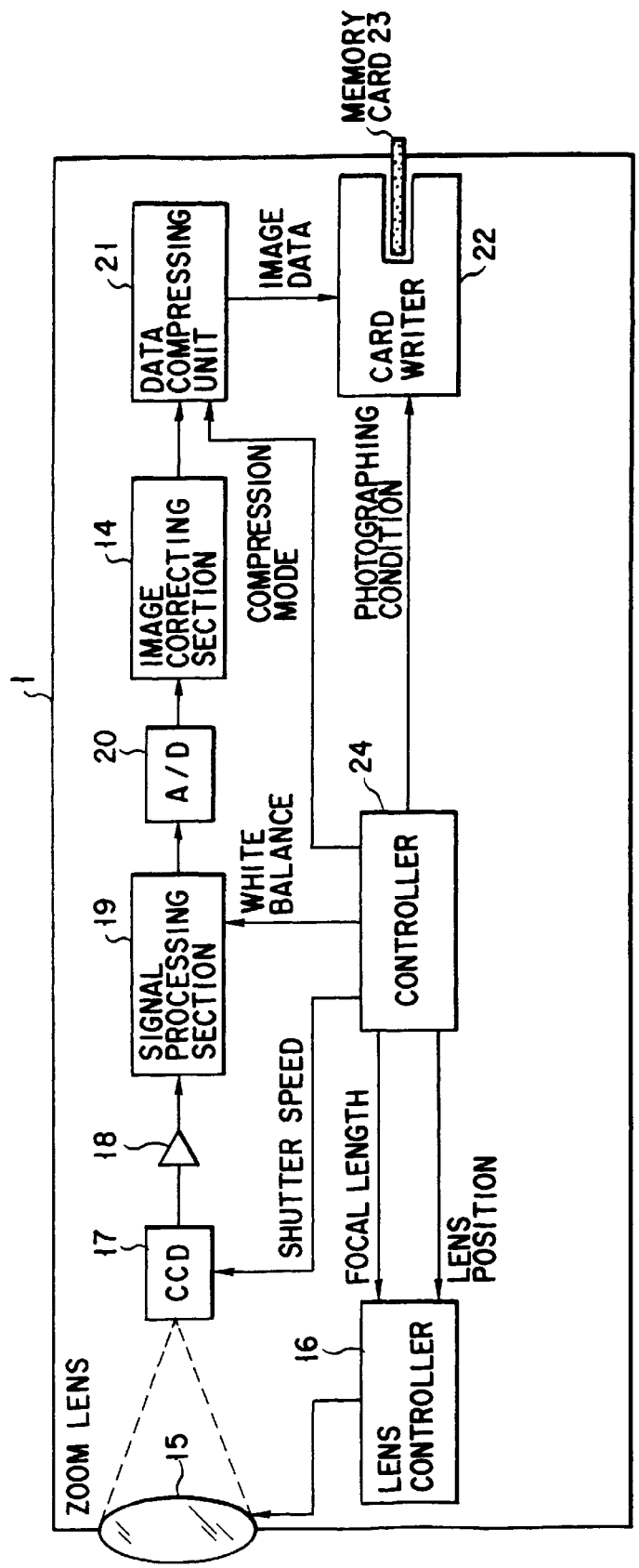
FIG. 6 is a view showing a practical array of a digital still camera in the first embodiment of the present invention.

Although, in the first embodiment, the distortion aberration only is corrected, it may be possible to correct optical aberration such as spherical aberration and comatic aberration. If distortion correction processing as at an image processing section 26 is performed in the digital still camera as shown in FIG. 6 before being stored in the memory card, it is possible to alleviate a burden on the image processing section.

Although, in the present embodiment, data is transferred in offline, this data transfer may be effected in online with the use of an RS232C, GPIB, SCSI, etc.

Further, the image correction section 14 may be so constructed as shown in FIG. 4B. The image correction section includes an address table 59b for finding the point X coordinate directly from the point Y coordinate and center O coordinate and focal position and lens position and obviates the need to calculate ΔS based on Equation (1). It can effect image correction at a very high speed.

In the first embodiment, positional displacement is detected with the use of a G signal close to the relative luminosity characteristic of a human and, therefore, a composed image can be obtained in a form to be well-joined upon being viewed by the human eye. In the present embodiment, upon the picking up of the three images, the auto-focusing, auto-exposure and auto-white balance adjustment are carried out each time. In this case, if the focusing lens position set by the auto-focusing, shutter speed value of the CCD 17 set by the auto-exposure, and auto-white balance adjusting value set by the auto-white balance adjustment largely differ between the images a, b and c, there is a possibility that better displacement detection will be carried out and that the image-to-image connection seam will be clearly prominent.

Figure 7:
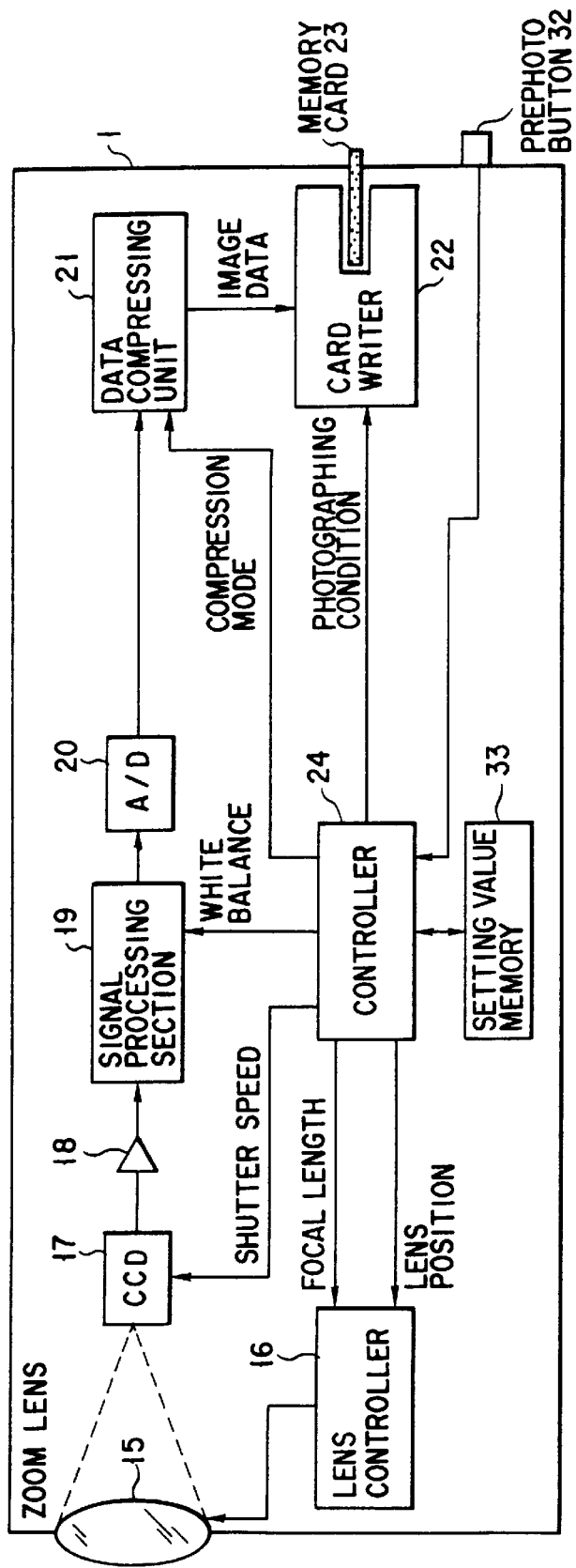
FIG. 7 shows a practical array of a digital still camera having a prephoto-button.

Upon the taking of respective part-images, photographing may be made in a manual mode with the focusing lens position, shutter speed value and white balance adjustment value fixed. If there is a variation, an alarm may be sounded. Further, through a return to a first image-taking position at all times, second and subsequent images may be taken through the focus and AE (Automatic exposure) lock. If, however, the focal length is inadvertently varied, then it will be difficult to return it to an original position. In such a case, a prephoto-button 32 and setting value memory 33 may be provided as shown in FIG. 7. The setting value memory 33 is of such a type that the respective setting values utilized for photographing, such as the focusing lens position, shutter speed value, white balance adjusting value, focusing distance length or compression mode, are stored at each taking of an image. It is, therefore, possible to readily obtain the respective setting values at the identical levels at each taking of the image.

The prephoto-button 32 sets the photographing setting value to the value of the setting value memory 33. That is, various values, such as the focusing lens position, shutter speed value, white balance adjustment value, focal length and compression mode, upon the taking of a previous image, can be used with the use of the prephoto-button 32. By doing so, the photographing condition can be positively made to be the same as the previous photographing condition. When the prephoto-button is depressed at the taking of the image b it is possible to utilize the respective setting values of the image a previously taken and, when at the taking of the image c it is possible to utilize the respective setting values (that is, the respective setting values of the image b) previously taken.

By the use of the prephoto button not only better displacement detection is carried out but also the image-to-image seam can be made less prominent.

Figure 8:
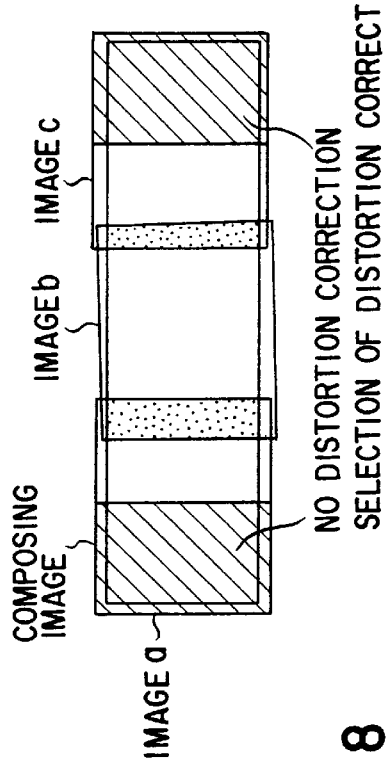
FIG. 8 is a view showing distortion-corrected areas and not-corrected areas at a time of composing an image on a second embodiment of the present invention.

An image processing apparatus according to a second embodiment of the present invention will be explained below with reference to FIGS. 8 and 9. In the first embodiment as set out above, distortion correction is made on a whole image to be composed. In general, however, it takes some time to perform correction calculation and, if a composed image produces no visually disagreeing feeling in viewer, it is not necessary to make distortion correction on the whole image. Although the images a and b are composed in FIG. 24, the left half of the image a for instance does not take part in composition calculation and, in this respect, need not effect distortion correction, so that the calculation time can be reduced.

This embodiment is directed to reducing the processing time and is different from the first embodiment in that a switch A34 is provided between an RGB converting section 31 and an image correcting section 14 and that a switch B35 is provided between the image correcting section 14 and a signal switching section 29. FIG. 8 shows an image composing state and those areas not subjected to the distortion correction are indicated by a cross-hatched in FIG. 8. In the compose processing by the present embodiment, the switch A 34 and switch B 35 are thrown on their e sides for those image signals corresponding to the cross-hatched areas and on their d sides to other areas.

Since, in the second embodiment above, the distortion correction is not always made on the whole area of the image, it is possible to largely reduce a calculation time involved. Further, the distortion correction is performed on those displacement detection area of the image and on those image-to-image seams, so that a better composed image can be obtained without receiving any visually disagreeing impression.

An image processing apparatus according to a third embodiment of the present invention will be explained below with reference to FIG. 10.

Although, in the second embodiment above, the distortion correction is performed on the overlapped area, there is sometimes the case where, in the case of photographing a natural image such as landscape, no disagreeing impression is received from a composed image even if no distortion correction is performed on it. However, no correct displacement amount is found unless any distortion correction is performed in the detection of the positional displacement. In a third embodiment, distortion correction is performed only when the positional displacement is performed.

Figure 10:
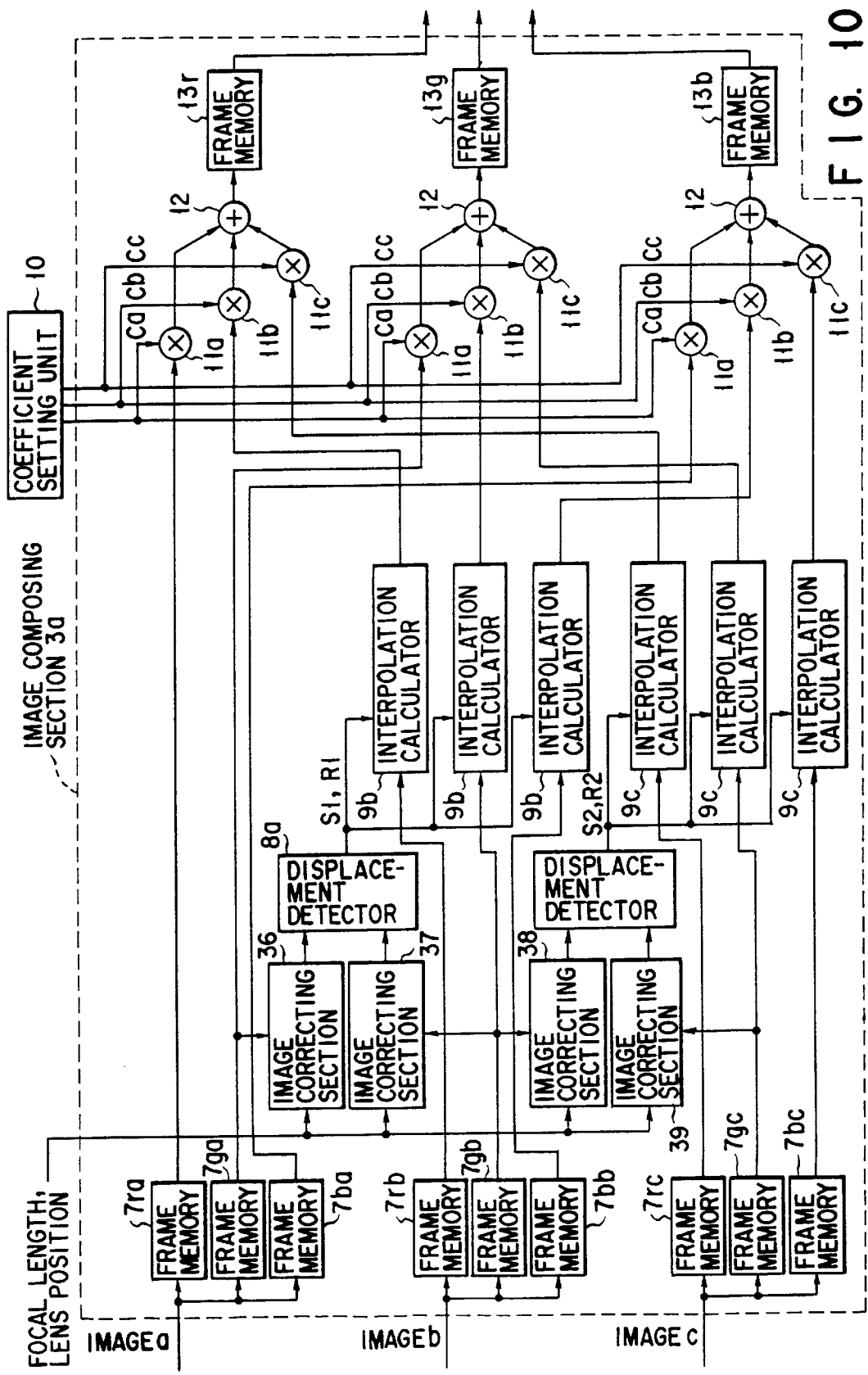
FIG. 10 is a view showing a practical array of an image composing section on an image processing apparatus according to a third embodiment of the present invention.

As shown in FIG. 10, image correcting sections 36 to 39 are provided for, based on a focal distance and lens position, performing correction processing on those images read out of frame memories. By the image correcting sections 36 to 39, distortion correction is performed on only image signals corresponding to those areas for which the displacement detection is made. The image correcting sections are of the same type as shown in FIG. 2 and, in accordance with the focal distance and lens position corresponding correction performing is carried out.

According to the embodiment above, the distortion correction areas can be made very small and the calculation time can be largely reduced in comparison with the second embodiment.

The procedures of the first to third embodiments can be properly switched in accordance with a subject to be photographed.

If, for a subject, such as a design drawing, demanding accuracy, distortion correction is made on all image areas as in the case of the first embodiment and, for a subject, such as a natural image (the landscape), demanding no proper accuracy, the distortion correction is not effected on the whole image as in the second or the third embodiment, then it is possible to achieve a saving in the calculation time required.

Figure 11:
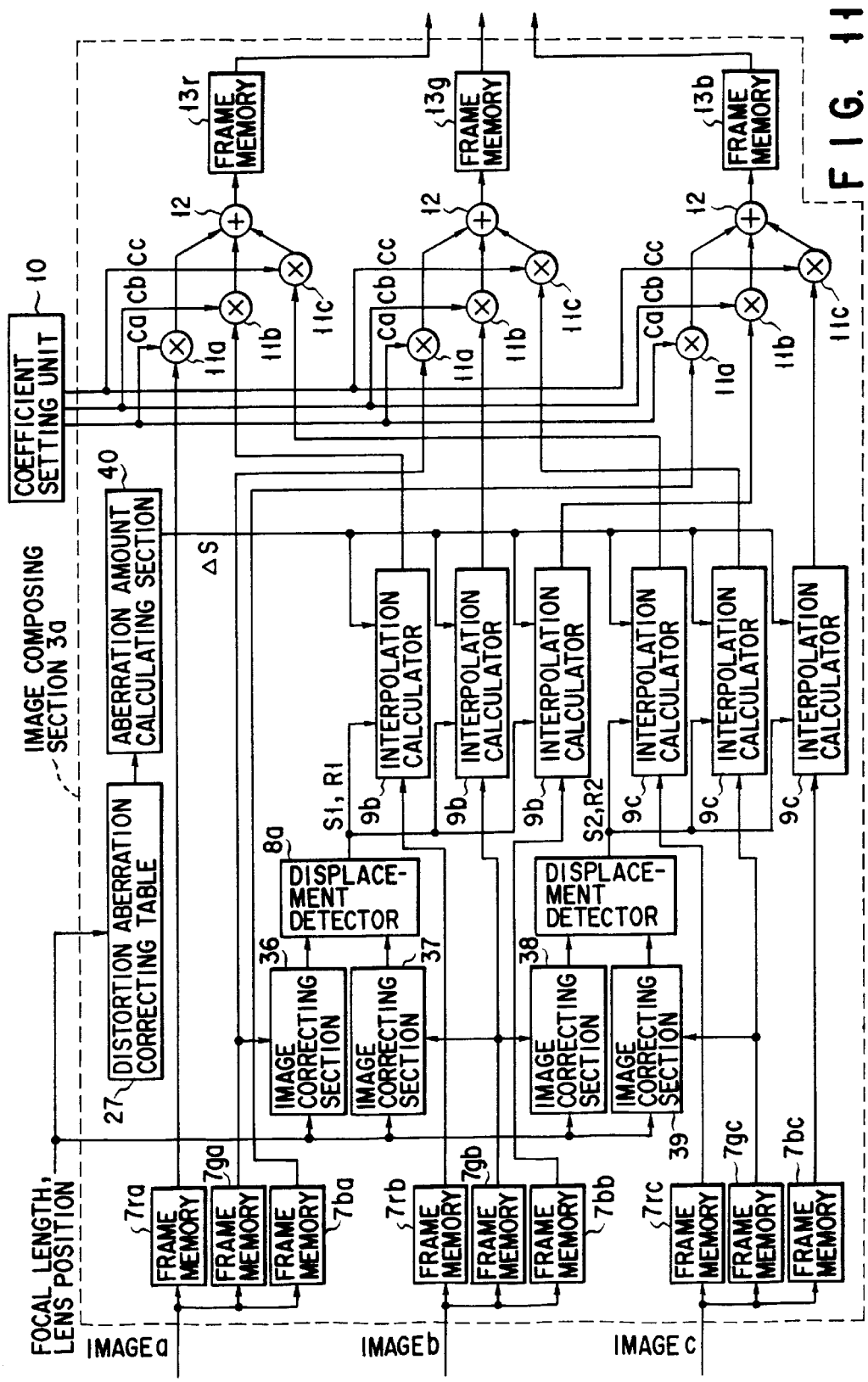
FIG. 11 is a view showing a practical array of an image composing section on an image processing apparatus according to a fourth embodiment of the present embodiment.
Figure 23:
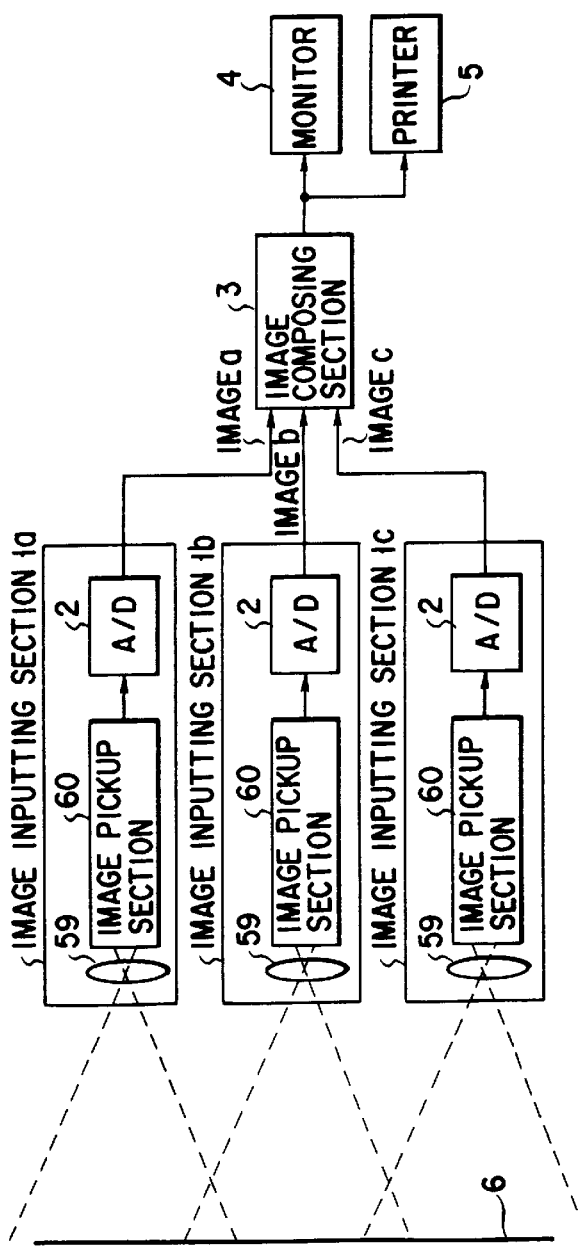
FIG. 23 is a view showing a whole arrangement of a conventional image processing apparatus.
Figure 25:
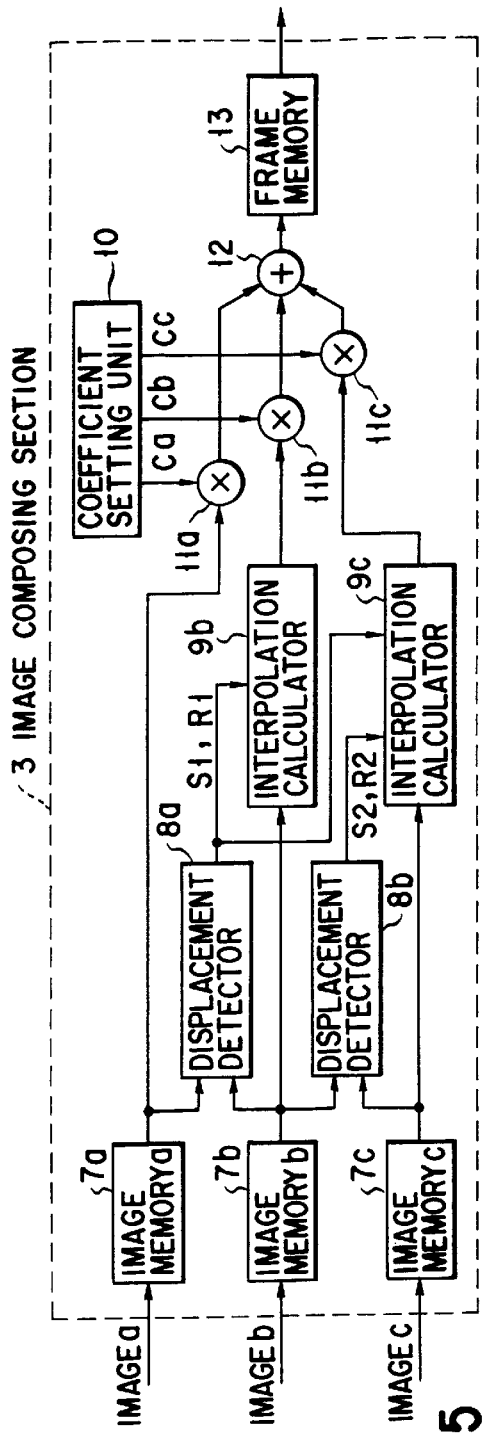
FIG. 25 is a view showing an arrangement of an image composing section in FIG. 24.

An image processing apparatus according to a fourth embodiment of the present invention will be explained below with reference to FIG. 11.

The fourth embodiment constitutes an improvement over the third embodiment above and can also achieve distortion correction at a time of an interpolation calculation for image movement. In the fourth embodiment, the so-called affine transformation is performed at interpolation calculators 9b, 9c and interpolation calculation is performed on a coordinate system with a distortion aberration correction amount ΔS applied to those coordinate values found through the affine transformation. As shown in FIG. 11, the interpolation calculators 9b, 9c performs interpolation calculations on an aberration amount M obtained from distortion correction values a1, a2 corresponding to a focal distance and lens position and S1, R1 or S2, R2 obtained from the distortion detector 8a or 8b.

In the fourth embodiment, the movement of images and distortion correction can be effected by one interpolation calculation at a time and it is possible to, effecting an accurate image composition, largely reduce calculation time involved.

An image processing apparatus according to a fifth embodiment of the present invention will be explained below with reference to FIGS. 12 and 13.

The fifth embodiment shows an image processing apparatus for correcting an aberration physically, not performing signal processing. In this embodiment, a flat document 42 on a stand base plate 46 is photographed by a photographing camera 43 mounted on a photographing stand 41. The photographing camera 43 is of basically the same arrangement as the digital still camera 1. Further, a finder 44 is provided on the photographing camera 43 with a detachable memory card 23 mounted therein. A glass sheet 45 is placed on the flat document 42 on the stand base plate 46 and serves both as a pressing base plate and as a glass sheet for aberration correction.

Upon the photographing of an image in a plurality of parts, the flat document 42 is moved in those up/down and right/left directions on the stand base plate 46, by the image processing apparatus, with the document pressed with the glass sheet 45 for aberration correction. The glass sheet 45 is so designed as to correct the distortion aberration of the camera 43 and serves to physically eliminate the distortion aberration of the camera involved. It is necessary to perform aberration correction processing at the time of effecting compose processing. Signal processing, being the same as the conventional one, can be performed at high speeds.

The aberration correction glass sheet 45, being selected in accordance with the focal length and lens position of the photographing camera, can enhance the accuracy of the position detection and image composition. Further, when the flat document is to be moved, it is roughly aligned in position through the utilization of the stand base plate 46 with a movement marker 47 provided as shown in FIG. 13 (in this case, four divided parts), so that, upon correlation calculation with the displacement detector, a search range can be narrowed and hence high-speed processing can be carried out.

An image processing apparatus according to a sixth embodiment of the present invention will be explained below with reference to FIGS. 14A, 14B and 15.

The sixth embodiment is properly applied to the case where the aberration of a photographing camera is unknown and characterized in that, prior to photographing an image in parts, an aberration of distortion, etc., is detected with the use of a sheet for aberration detection.

FIG. 14A shows one practical form of a sheet 47 for aberration detection where nine solid dots are provided as a marker and FIG. 14B shows a distorted state resulting from the aberration, that is, a state where the black dots are displaced to those as indicated by open dots. The data, a1, a2, in Equation (1) can be calculated from a positional relation of the solid and open dots.

FIG. 15 shows an arrangement for calculating a correction value.

The arrangement comprises a photographing camera 43 equivalent to that shown in FIG. 12, a sheet 47 for aberration detection which is placed on a stand bottom plate 46, a memory card 23 for recording image information on the sheet 47 for photographed aberration detection, a card reader 25 for reading out image information on the memory card 23, a data expanding section 30 for data-expanding the image information, an RGB converting section 31 for converting the information to RGB signals, an aberration correction value calculation section 48 for calculation correction values, a1, a2, for aberration correction, and a distortion aberration correction table 27 for recording calculated correction values, a1, a2.

In the image processing apparatus, the aberration detection sheet 47 is imaged by the photographing camera 43 and corresponding image information is stored in the memory card 23. The image information in the memory card 23 is read out of the card reader 25. After being data-expanded by the data-expanding section 30, the image information is converted to RGB signals by means of the RGB converting section 31. Then the signals are supplied to the aberration correction value calculating section 48 where correction values, a1, a2, are calculated. These correction values are written in the distortion aberration table 27 at those predetermined addresses determined by the focal length and lens position. It is possible to perform compose processing with the use of the distortion aberration table 27 above.

According to the present embodiment, even in the case where the aberration of the photographing camera is unknown and the characteristic, etc., of the photographing lens varies with the passage of time, it is possible to obtain a better image composition through the detection of the aberration and, further, to readily calculate the correction value of the aberration through the utilization of the aberration detection sheet.

According to the present embodiment, images are taken with a cross mark in FIG. 16 displayed at a finder and centered at the nine solid dots and, by so doing, it is possible to enhance the accuracy with which the aberration is calculated. As the sheet 47 for aberration detection use may be made of not only the aberration detection sheet 47 as shown in FIG. 14A but also a grid-like pattern sheet such as graph paper. Although, in the present embodiment, the data is transferred, in offline, through the memory card, it may also be transferred, in online, with the use of RS232C, GPIB, SCSI, etc. Further, it is possible to, the data being processed for each RGB signal, prepare a correction table with consideration paid to an adverse effect resulting from chromatic aberration. An image processing apparatus according to a seventh embodiment of the present invention will be explained below with reference to FIGS. 17 and 18.

Generally, in the case where a three-dimensional subject, not a flat document, is photographed a plurality of times, parallax occurs between the photographed images and, as shown in FIG. 27, the same image will be photographed in different form. It is, therefore, necessary to perform compose processing after such distortion has been corrected. The deformation of the image resulting from the parallax is not determined by an amount of variation, such as the aberration, originating from the focal length and lens position, but depends upon how far the subject is present in front of the camera. The way the correction is made naturally varies unlike the aberration.

FIG. 18 shows a practical form of image processing apparatus.

Figure 27A:
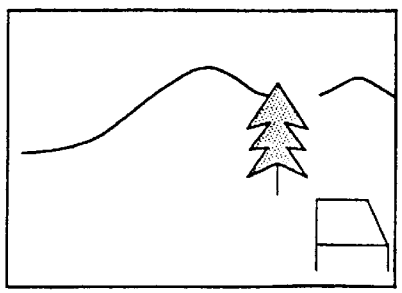
FIG. 27A is a view showing a composition of a plurality of shot images of varying distances in a front/back direction.
Figure 27B:
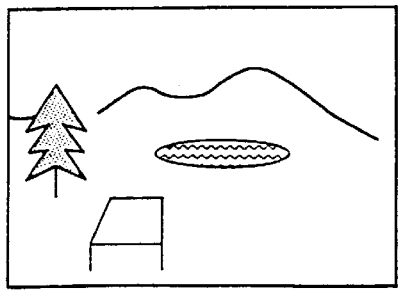
FIG. 27B is a view showing the images with a right side distorted to an image seen from a viewpoint of FIG. 27A.

In the image processing apparatus, a range finder 52 is connected to an image correction section 49 and adapted to measure a distance up to a subject. The image correction section 49 comprises a parallax amount calculating section 50 for correcting the parallax and calculating a parallax amount from distance information and a parallax correcting section 51 for performing parallax correction based on the parallax amount. The parallax correcting section 51 distorts a right-side image, for example, so that an image as shown in FIG. 27B is changed to an image as viewed by the observer's eye from FIG. 27A (FIGS. 17A and 17B). The corrected image and the image shown in FIG. 27A are composed by an image composing section 3a.

Since, according to the embodiment above, the image-compose processing is carried out after parallax correction has been made, a better image-to-image seam can be obtained. The apparatus includes a range-finding means, so that the parallax can be readily detected. Further, as the range finder use can be made of various devices using, for example, an infrared ray, ultrasound and radar and it is, therefore, possible to accurately detect the parallax.

Needless to say, although the aberration correction processing as set out in the first through sixth embodiments is performed prior to the parallax correction processing, it is possible to correct both the parallax and aberration involved. On the other hand, the left-side image may be distorted so that the image as shown in FIG. 27A is changed to an image as viewed by the observer's eye from FIG. 27B. Further, right and left images may be distorted so that an image is changed to an image as viewed by the observer's eye from any given point.

FIG. 19 shows an arrangement of an image processing apparatus according to an eighth embodiment of the present invention.

In the above-mentioned embodiment, the range finder is used to measure the distance of the subject, but, in addition to the taking of images by the digital still camera, the measurement has also to be made by the range finder so that a cumbersome operation is necessary. A parallax problem may possibly arise between the digital still cameraand the range finder. With consideration given to these, an image processing apparatus using no range finder will be explained below in connection with the present embodiment.

In this image processing apparatus, a range calculating section 54 is provided for finding a distance of a subject on a given coordinate position on the basis of those RGB signals to which data are converted by an RGB converting section 31 in the image processing section 26 shown in FIG. 2.

In the range collecting section 54, a distance to the subject is calculated, based on the principle of a stereoscopic vision generally known by a stereo measuring section 57, with the use of those stereo-images written in frame memories A55 and B56. For example, the image as shown in FIG. 27A is written into the frame memory A55 and the image as shown in FIG. 27B into the frame memory B56.

In the eighth embodiment above, the subject distance is found from those image signals taken by the digital still camera so that the parallax is corrected. This obviates the need to provide any special distance measuring device such as the range finder.

Although, in the embodiment above, the stereo-measurement is used for distance detection, use may be made of a plurality of images of varying focused subject distances or a distance may be calculated through the recognition of an object involved.

An image processing apparatus according to a ninth embodiment of the present embodiment will be explained below with reference to FIG. 20. The image processing apparatus of the present invention can be applied to a lens array as shown in FIG. 20.

In the image processing apparatus, a lens array 61 having nine lenses as formed by a press working, is provided together with an image pick-up element array 62, such as a CCD, for picking up those images focused by the respective lenses. The outputs of those image picking-up elements in the image picking-up element array 62 are amplified by preamplifiers 18 and, after signal processing, such as white balance adjustment and γ correction, performed by signal processing sections 19, are A/D converted by A/D converting sections 20 to digital signals. These digital signals are input to image correction sections 63. The image correction sections 63 are adapted to correct the aberration such as the distortion correction and parallax correction. Those corrected image signals are composed by means of an image-compose processing section and then output to a monitor 4 and to a printer 5.

In the ninth embodiment, those images picked up by the lens array are subjected to correction and then compose-processing, so that a wide-view image with a larger number of pixels can be obtained with a very good image-to-image seam. Although the lenses of the lens array have been explained as being nine in number on the present embodiment, more number of lenses may be employed. Further, the lens array can be manufactured at low costs through the utilization of the press-working, etc. Although, in the present embodiment, the image correcting section is provided for the image pick-up element, only one image correcting section is provided. If those image signals picked up by the respective image pick-up elements are processed in a time-sequential way, a circuit size can be made compact.

An image processing apparatus according to a tenth embodiment of the present embodiment will be explained below with reference to FIGS. 21A, 21B and 22.

The parallax will be explained below with reference to FIG. 21.

In FIG. 21A, photographing lenses 59a, 59b for imaging objects M, N are situated in a direction orthogonal to their light axes such that they are spaced predetermined distances apart. Imaging planes 66a, 66b are formed behind the respective photographing lenses 59a, 59b and, for example, solid image pick-up elements such as a CCD are provided.

In the formation of an image, in general, object light passes through a center position (an optical center) of the lens and its image formation position can be approximated. That is, m1, n1 become the image formation positions corresponding to those imaging positions of objects M, N taken by the photographing lens 59a. From FIG. 21A it is found that greater different parallax is produced in an m1, n1 interval and in an m2, n2 interval. FIG. 21B shows, on the other hand, the case where the photographing lens is rotated about the optical center of the photographing lens. From this it is found that an m2', n2' interval of the image formation positions of the object's M, N becomes substantially equal to an m1, n1 interval and that there is almost no parallax. The embodiment above utilizes this principle on which it is possible to construct, into a composed image, a plurality of images photographed with the use of parallax correcting means for moving the optical center of the photographing lens as a center of rotation.

FIG. 22 shows a practical form of the image processing apparatus.

The image processing apparatus comprises a digital still camera 67 equivalent to that as set out above and a parallax correcting section 74 utilizing a tripod.

In the parallax correcting section 74 a head 72 is mounted by a rotation shaft 69 relative to the tripod 71. An XYZ stage 68 is mounted to the head. The digital still camera 67 is mounted to the XYZ stage 68 and the optical center 72 of the camera's photographing lens 59 is so controlled by a controller 70 as to be positioned over the axis of the rotation shaft 69 of the tripod 71. A handle 73 is provided so as to move the head 72.

The photographer can photograph a plurality of images by varying the photographing directions under control of the handle 73. Since, at this time, the controller 70 controls the XYZ stage such that the optical center 72 of the photographing lens is positioned over the axis of the rotation shaft 69 of the tripod, images can be taken almost without involving parallax. Further, the optical center 72 of the photographing lens varies due to the focal length of the photographing lens and lens position and the controller 70 is controlled in accordance with these values.

According to the present invention, as set out above, control is so made that the optical center of the photographing lens is brought at all time to the same position at the setting of a photographing direction varied. It is, therefore, possible to obtain an image where parallax is corrected in a better way. It is also possible to readily photograph images with the head-equipped tripod. Further, parallax correction is made at the photographing of images and, therefore, no parallax correction processing is unnecessary at a time of composing together images. Although the tripod and XYZ stage are used as a parallax correcting means, any dedicated drive device may be used.

According to the present invention, the parallax can be eliminated in a better way, but there remains a so-called swing/tilt phenomenon, that is, on kind of distortion. This distortion can be corrected by the apparatus shown in FIG. 22. The swing/tilt amount is determined depending upon how many times the light axis is rotated on the tripod.

Alternatively, a rotation angle detecting sensor 75 is provided on the tripod and the rotation angle detected is written into a memory card as a header for images so that it may be read out at the correction of the swing/tilt defect and $\Delta S$ be found.

According to the present invention, as set out above, it is possible to provide an image processing apparatus for performing image-compose processing by, at the time of composing images, correcting the aberration of the photographing lens and the geometric distortion such as parallax.

What is claimed is:

1. An image processing apparatus comprising:
an image information receiving section for receiving image information of an image picked up by an image inputting unit which comprises a photographing lens system for forming an optical image and at least one image pickup element for photoelectrically converting the optical image into an image;
an image correcting section for correcting optical aberration occurring under a condition which is represented by an optical parameter of the image inputting unit, with respect to at least one image obtained from the image information receiving section; and
an image joining section for detecting a positional relationship between a plurality of images including said at least one image whose optical aberration is corrected by the image correcting section, and for joining the images together.

2. The image processing apparatus according to claim 1, which further comprises a storage unit for storing information regarding the optical parameter of the image inputting unit.

3. The image processing apparatus according to claim 2, wherein the storage unit stores information regarding optical aberration of the photographing lens system.

4. The image processing apparatus according to claim 2, wherein the storage section stores information regarding at least one of photographing conditions of a focal length, a position of a lens at a photographing time, a shutter speed, a white balance and a compression mode.

5. The image processing apparatus according to claim 2, wherein the image correcting section corrects optical aberration of the photographing lens system based on a predetermined calculation formula and correction coefficients calculated from the optical parameter stored in the storage section.

6. The image processing apparatus according to claim 1, wherein the image correcting section comprises an optical system for use in aberration correction, which is located between the image inputting section and a subject to be photographed.

7. The image processing apparatus according to claim 1, wherein the image correcting section includes an aberration detecting section for detecting optical aberration of the photographing lens system.

8. The image processing apparatus according to claim 1, which further comprises an image storage unit for storing at least one of image data output from the image inputting unit and image data subjected to aberration correction by the image correcting section, and wherein the image joining section detects a positional relationship between images including an image represented by image data which is output from the image storage unit, and joins the images on the basis of the detected positional relationship.

9. The image processing apparatus according to claim 8, wherein the image storage unit stores information regarding the optical parameter of the image inputting unit as a header of the image data which is output from the image inputting unit.

10. The image processing apparatus according to claim 8, wherein the image storage unit is a detachable recording medium.

11. The image processing apparatus according to claim 8, which further comprises a correction data generating unit for generating data for use in correction of the image correcting section, on the basis of a positional change of a marker located in a predetermined position on an aberration detection sheet, the positional change of the marker being detected when the aberration detection sheet is photographed by the image inputting unit.

12. The image processing apparatus according to claim 11, wherein the image inputting unit includes a finder having a marker for use in alignment, and positions the aberration detection sheet and the image inputting unit with respect to each other by use of the finder.

13. The image processing apparatus according to claim 1, wherein the image inputting unit includes a lens array having a plurality of lenses and an image pickup array for photoelectrically converting an optical image formed by the lenses.

14. The image processing apparatus according to claim 13, wherein the image correcting section successively corrects images obtained by the image pickup array.

15. The image processing apparatus according to claim 1, wherein the image correcting section performs parallax correction on the image whose optical aberration is corrected.

16. The image processing apparatus according to claim 1, which further comprises an operation section for setting, when each of images is photographed, a photographing condition for photographing said each image such that the photographing condition is the same as photographing conditions for photographing the other images.

17. The image processing apparatus according to claim 16, wherein the photographing condition set by the operation section is the same as a previous photographing condition set by the operation section.

18. The image processing apparatus according to claim 1, wherein:

images input by the image inputting section are color images produced by RGE color signals which are input so as to be separated from each other; and the image correcting section has a detecting unit for detecting a displacement amount based on a G signal of the color signals, and corrects the aberration in accordance with the detected displacement amount.

19. An image processing apparatus comprising:

an image inputting unit comprising at least one image inputting section which is provided integral with or separate from an apparatus body, and comprises a photographing lens for forming an optical image and at least one image pickup element for photoelectrically converting the optical image into an image;

an image correcting section for correcting optical aberration occurring under a condition which is represented by an optical parameter of said at least one image inputting section, with respect to at least one image obtained from the image inputting unit; and an image joining section for detecting a positional relationship between images including said at least one image subjected to aberration correction, and for joining the images together.

20. An image processing method comprising:

a step of obtaining a plurality of image signals by use of an image inputting unit comprising at least one image pickup element which photoelectrically converts an image of a subject, which is picked up by a photographing lens;

a step of correcting that optical aberration of one or more images obtained by the image inputting unit, which occurs under a condition indicated by an optical parameter of the image inputting unit, thereby obtaining one or more corrected images; and a step of detecting a positional relationship between a plurality of images including said corrected one or more images, and joining the plurality of images based on the detected positional relationship.

21. The image processing apparatus according to claim 20, which further comprising:

a step of storing information regarding the optical parameter of the image inputting unit; and a step of correcting optical aberration of the photographing lens based on a predetermined calculation formula and a correction coefficient calculated from the optical parameter stored in the storing step.

22. The image processing method according to claim 20, which further comprising:

a step of detecting optical aberration of the photographing lens; and a step of correcting images based on the detected optical aberration.

23. The image processing method according to claim 20, which further comprising:

a step of storing data regarding a photographing condition necessary for the aberration correction, along with the optical parameter; and a step of correcting the optical aberration of the photographing lens based on the stored photographing condition.

24. The image processing method according to claim 20, which further comprising:

a step of photographing an aberration detection sheet having a marker located in a predetermined position, by use of the image inputting unit;

a step of generating correction data in accordance with a positional change of the marker; and a step of generating a corrected image based on the correction data.

25. The image processing method according to claim 20, wherein:

the images input by said image inputting section are color images produced by RGB color signals which are input so as to be separated from each other; and a displacement amount is detected on a G signal of the color signals, and the aberration is corrected in accordance with the detected displacement amount.

26. An image processing apparatus comprising:

an image information receiving section for receiving image information of an image picked up by an image inputting unit which comprises a photographing lens system for forming an optical image and at least one image pickup element for photoelectrically converting the optical image into an image;

an image correcting section for correcting optical aberration of the photographing lens system which occurs under a condition which is represented by an optical parameter of the image inputting unit, with respect to at least one image obtained from the image information receiving section; and an image joining section for detecting a positional relationship between a plurality of images including said at least one image whose optical aberration is corrected by the image correcting section, and for joining the images together.

* * * * *

UNITED STATES PATENT AND TRADEMARK OFFICE
CERTIFICATE OF CORRECTION

PATENT NO. : 6,211,911 B1
DATED : April 3, 2001
INVENTOR(S) : Yasuhiro Komiya et al.

It is certified that error appears in the above-identified patent and that said Letters Patent is hereby corrected as shown below:

<u>Title page,</u>
Item [54], Title, after "APPARATUS" insert -- FOR JOINING A PLURALITY OF IMAGES --;

Item [75], Inventors, change "Kangda Wang" to -- Koutatsu Oura --.

Signed and Sealed this

Twenty-second Day of January, 2002

*Attest:*

JAMES E. ROGAN
*Attesting Officer*  *Director of the United States Patent and Trademark Office*